(12) United States Patent
Mufti

(10) Patent No.: US 10,721,656 B2
(45) Date of Patent: Jul. 21, 2020

(54) TELECOMMUNICATION NETWORK PRE-ESTABLISHMENT SERVICE INTERRUPTION RESPONSE

(71) Applicant: T-Mobile USA, Inc., Bellevue, WA (US)

(72) Inventor: Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/108,981

(22) Filed: Aug. 22, 2018

(65) Prior Publication Data

US 2018/0368028 A1    Dec. 20, 2018

Related U.S. Application Data

(62) Division of application No. 14/552,871, filed on Nov. 25, 2014, now Pat. No. 10,080,163.

(Continued)

(51) Int. Cl.
*H04W 36/00* (2009.01)
*H04W 36/08* (2009.01)
(Continued)

(52) U.S. Cl.
CPC ....... *H04W 36/0022* (2013.01); *H04W 36/08* (2013.01); *H04W 36/30* (2013.01);
(Continued)

(58) Field of Classification Search
CPC . H04W 36/0022; H04W 40/36; H04W 36/08; H04W 40/14; H04W 36/30; H04W 76/18; H04W 76/22
See application file for complete search history.

(56) References Cited

U.S. PATENT DOCUMENTS

| 7,257,374 B1 | 8/2007 | Creigh |
| 8,655,357 B1 | 2/2014 | Gazzard et al. |

(Continued)

FOREIGN PATENT DOCUMENTS

| CN | 101110833 | 1/2008 |
| CN | 101483896 A | 7/2009 |

(Continued)

OTHER PUBLICATIONS

European Office Action dated Feb. 22, 2019 for European patent application No. 15821476.7, a counterpart foreign application of U.S. Appl. No. 14/552,871, 13 pages.

(Continued)

*Primary Examiner* — Moo Jeong
(74) *Attorney, Agent, or Firm* — Lee & Hayes, P.C.

(57) ABSTRACT

Telecommunication network components configured to manage a handover of a communication session of user equipment from a packet-switched access network to a circuit-switched access network are described herein. The components may receive a handover request from user equipment, allocate circuit-switched access network resources, and request a session transfer. When the session transfer is invalid, e.g., during a pre-establishment phase of a communication session, the components may reject the transfer within a selected time and provide an invalid-handover message. Components may, in response to an invalid handover request, transmit a rejection of the session transfer and a fallback-trigger message.

17 Claims, 13 Drawing Sheets

Related U.S. Application Data

(60) Provisional application No. 62/024,884, filed on Jul. 15, 2014.

(51) Int. Cl.
*H04W 36/30* (2009.01)
*H04W 40/14* (2009.01)
*H04W 40/36* (2009.01)
*H04W 76/18* (2018.01)
*H04W 76/22* (2018.01)

(52) U.S. Cl.
CPC .......... *H04W 40/14* (2013.01); *H04W 40/36* (2013.01); *H04W 76/18* (2018.02); *H04W 76/22* (2018.02)

(56) References Cited

U.S. PATENT DOCUMENTS

| | | |
|---|---|---|
| 8,718,636 B1 | 5/2014 | Pankajakshan |
| 8,879,503 B2 | 11/2014 | Dwyer et al. |
| 8,995,959 B2 | 3/2015 | Cakulev et al. |
| 2004/0199641 A1 | 10/2004 | Bajko |
| 2004/0199649 A1 | 10/2004 | Tarnanen et al. |
| 2005/0071679 A1 | 3/2005 | Kiss et al. |
| 2006/0084438 A1 | 4/2006 | Kwon |
| 2006/0239229 A1 | 10/2006 | Marinescu et al. |
| 2008/0039085 A1 | 2/2008 | Phan-Anh |
| 2008/0089272 A1 | 4/2008 | Ahokangas |
| 2008/0091814 A1 | 4/2008 | Xie |
| 2008/0126535 A1 | 5/2008 | Zhu et al. |
| 2008/0208937 A1 | 8/2008 | Yukumoto |
| 2008/0299927 A1 | 12/2008 | Tenbrook et al. |
| 2009/0017824 A1 | 1/2009 | Lee et al. |
| 2009/0068996 A1 | 3/2009 | Bakker et al. |
| 2009/0296566 A1 | 12/2009 | Yasrebl et al. |
| 2009/0296567 A1 | 12/2009 | Yasrebi et al. |
| 2010/0054209 A1 | 3/2010 | Mahdi |
| 2010/0223492 A1 | 9/2010 | Farrugia et al. |
| 2010/0311386 A1 | 12/2010 | Edge et al. |
| 2010/0329243 A1 | 12/2010 | Buckley et al. |
| 2010/0329244 A1 | 12/2010 | Buckley et al. |
| 2011/0013597 A1 | 1/2011 | Hwang et al. |
| 2011/0040836 A1 | 2/2011 | Allen et al. |
| 2011/0040882 A1 | 2/2011 | Delos Reyes et al. |
| 2011/0058520 A1 | 3/2011 | Keller et al. |
| 2011/0230192 A1 | 9/2011 | Tiwari |
| 2011/0296034 A1 | 12/2011 | Mayer et al. |
| 2012/0039303 A1 | 2/2012 | Stenfelt et al. |
| 2012/0063420 A1 | 3/2012 | Long et al. |
| 2012/0069731 A1 | 3/2012 | Tooher et al. |
| 2012/0083240 A1 | 4/2012 | Patel |
| 2012/0120914 A1 | 5/2012 | Sedlacek et al. |
| 2012/0172042 A1 | 7/2012 | Drevon et al. |
| 2012/0236709 A1 | 9/2012 | Ramachandran et al. |
| 2012/0258712 A1 | 10/2012 | Rozinov |
| 2012/0295617 A1 | 11/2012 | Anchan et al. |
| 2013/0021998 A1 | 1/2013 | Shatsky |
| 2013/0023265 A1 | 1/2013 | Swaminathan et al. |
| 2013/0024574 A1 | 1/2013 | Lau |
| 2013/0029629 A1 | 1/2013 | Lindholm et al. |
| 2013/0051362 A1 | 2/2013 | Lee et al. |
| 2013/0143565 A1 | 6/2013 | Zisimopoulos et al. |
| 2013/0151586 A1 | 6/2013 | Morishige et al. |
| 2013/0174254 A1 | 7/2013 | Gould et al. |
| 2013/0179583 A1 | 7/2013 | Foti |
| 2013/0183965 A1 | 7/2013 | Ramachandran et al. |
| 2013/0195076 A1 | 8/2013 | Keller et al. |
| 2013/0329567 A1 | 12/2013 | Mathias et al. |
| 2014/0051443 A1 | 2/2014 | Diachina et al. |
| 2014/0064156 A1 | 3/2014 | Paladugu et al. |
| 2014/0143393 A1 | 5/2014 | Martinez Perea et al. |
| 2014/0176660 A1 | 6/2014 | Khay-Ibbat et al. |
| 2014/0219241 A1 | 8/2014 | Parron |
| 2014/0369267 A1 | 12/2014 | Ni et al. |
| 2014/0370842 A1 | 12/2014 | Abtin et al. |
| 2014/0378105 A1 | 12/2014 | Suryavanshi |
| 2015/0003342 A1 | 1/2015 | Swaminathan et al. |
| 2015/0016420 A1 | 1/2015 | Balabhadruni et al. |
| 2015/0024751 A1 | 1/2015 | Wong et al. |
| 2015/0382251 A1 | 12/2015 | Wang et al. |
| 2016/0021579 A1 | 1/2016 | Mufti |
| 2016/0021580 A1 | 1/2016 | Mufti |
| 2016/0029228 A1 | 1/2016 | Mufti |
| 2016/0037390 A1 | 2/2016 | Mufti et al. |
| 2016/0037471 A1 | 2/2016 | Mufti |
| 2016/0149965 A1 | 5/2016 | Kubik et al. |
| 2016/0150497 A1 | 5/2016 | Janosi et al. |
| 2016/0234744 A1 | 8/2016 | Wu et al. |
| 2016/0249401 A1 | 8/2016 | Tanaka et al. |
| 2016/0286516 A1 | 9/2016 | Wu |
| 2017/0180429 A1* | 6/2017 | Osterlund ........... H04L 65/1006 |

FOREIGN PATENT DOCUMENTS

| | | |
|---|---|---|
| CN | 101491057 A | 7/2009 |
| CN | 101543003 A | 9/2009 |
| CN | 101690285 | 3/2010 |
| CN | 101742589 | 6/2010 |
| CN | 101835121 | 9/2010 |
| CN | 102387557 | 3/2012 |
| CN | 102448036 | 5/2012 |
| CN | 102484850 | 5/2012 |
| CN | 102804848 A | 11/2012 |
| CN | 103561432 | 2/2014 |
| CN | 1037168516 | 4/2014 |
| EP | 2667659 | 11/2013 |
| KR | 1020090065320 | 6/2009 |
| KR | 1020100102363 | 9/2010 |
| WO | WO2007047477 | 4/2007 |
| WO | WO2012062379 | 5/2012 |
| WO | WO2013075746 | 5/2013 |
| WO | WO2013104651 | 7/2013 |
| WO | WO2013114158 | 8/2013 |
| WO | WO2013149918 | 10/2013 |
| WO | WO2013156061 | 10/2013 |
| WO | WO2014101500 | 7/2014 |
| WO | WO2014124658 | 8/2014 |
| WO | WO2014183668 | 11/2014 |

OTHER PUBLICATIONS

"3GPP TS 24.229 V10.9.0", 3rd Generation Partnership Project; Technical Specification Group Core Network and Terminals; IP multimedia call control protocol based on Session Initiation Protocol (SIP) and Session Description Protocol (SDP); Stage 3 (Release 10), retrieved at <http://www.3gpp.org/DynaReport/24229.htm>>, Jun. 27, 2014, pp. 1-24, 58-59, 96-109, 145-151, and 216-218.

"3GPP TS 24.229 V11.12.0", 3rd Generation Partnership Project; Technical Specification Group Core Network and Terminals; IP multimedia call control protocol based on Session Initiation Protocol (SIP) and Session Description Protocol (SDP); Stage 3 (Release 11), retrieved at <<http://www.3gpp.org/DynaReport/24229.htm>>, Jun. 27, 2014, 786 pages.

Chinese Office Action dated May 8, 2018 for Chinese patent application No. 201580051477.5, a counterpart foreign application of U.S. Pat. No. 9,699,211.

Chinese Office Action dated Aug. 14, 2018 for Chinese patent application No. 201580051477.5, a counterpart foreign application of U.S. Pat. No. 9,699,211.

"Digital cellular telecommunications system (Phase 2+); Universal Mobile Telecommunications System (UMTS); LTE; Mobile radio interface signalling layer 3;" General Aspects. 3GPP TS 24.007 V9.0.0. Oct. 2010. pp. 13, 15-17, 106-107.

DoCoMo, et al., "Handover Cancellation Timing", 3GPP Draft; 3rd Generation Partnership Project, Mobile Competence Centre, France, vol. RAN WG3, No. Kansas City, USA; Apr. 30, 2008.

European Office Action dated Aug. 6, 2018 for European patent application No. 15821476.7, a counterpart foreign application of U.S. Appl. No. 14/552,871, 5 pages.

(56) References Cited

OTHER PUBLICATIONS

Extended European Search Report dated Feb. 13, 2018 for European patent application No. 15824514.2, 12 pages.
Extended European Search Report dated Feb. 19, 2018 for European patent application No. 15830023.6, 12 pages.
Extended European Search Report dated Jan. 30, 2018 for European patent application No. 15829069.2, 15 pages.
Extended European Search Report dated Dec. 15, 2017 for European patent application No. 15822829.6, 16 pages.
Extended European Search Report dated Sep. 27, 2017 for European Patent Application No. 15821476.7, 16 pages.
Ericsson, "Clarification of conditions for transfer of calls in an early phase", retrieved on Mar. 3, 2014 at <<http://www.3gpp.org/ftp/Meetings_3GPP_SYNC/CT/CT/Docs/>>, 3GPP Draft, 3rd Generation Partnership Project, Mobile Competence Centre, France, vol. CT WG1, No. Guangzhou Jan. 20, 2014-Jan. 24, 2014, 2014, 9 pages.
Lucent Technologies, "Filter criteria matching and generation of third-Party Register request for network-initiated derigstration", 3GPP Draft; N1-050222, 3rd Generation Partnership Project (3GPP), Mobile Competence, France, vol. TSG CN, No. Sydney, Australia; Mar. 2, 2005, retrieved on Mar. 2, 2005.
Nokia Siemens Networks et al: "Multiple EATF addressing",3GPP Draft; S2-113311, vol. SA WG2, No. Naantali; Jul. 11, 2011, Jul. 5, 2011, XP050548597, 2 pages.
Nokia, "Third party registration optimisation", 3GPP Draft; N1-041441_3RDPARTYREGOPT-A, 3rd Generation Partnership Project (3GPP), France, vol. CN WG1, No. Sophia Antipolis, France, Aug. 10, 2004. retrieved on Aug. 10, 2004.
Nsn, et al., "Correct request for PS to CS cancelled handling", retrieved on Mar. 3, 2014 at <<http://www.3gpp.org/ftp/Meetings_3GPP_SYNC/CT/CT/Docs/>>, 3GPP Draft, 3rd Generation Partnership Project, Mobile Competence Centre, France, vol. CT WG1, No. Guangzhou Jan. 20, 2014-Jan. 24, 2014, 2014, 3 pages.
Office action for U.S. Appl. No. 14/552,871, dated Jan. 11, 2018, Mufti, "Telecommunication Network Pre-Establishment Service Interruption Response", 19 pages.
Office action for U.S. Appl. No. 14/568,633, dated Oct. 19, 2017, Mufti, "Suppressing Third Party Registration and Third Party Deregistration Actions" , 17 pages.
Office action for U.S. Appl. No. 14/689,318, dated Oct. 19, 2017, Mufti, "Telecommunications Network Non-Establishment Response", 25 pages.
Office action for U.S. Appl. No. 14/689,318, dated Oct. 24, 2016, Mufti, "Telecommunications Network Non-Establishment Response", 18 pages.
Office action for U.S. Appl. No. 14/552,871, dated Oct. 6, 2016, Mufti, "Telecommunication Network Pre-Establishment Service Interruption Response", 23 pages.
Office action for U.S. Appl. No. 14/552,945, dated Nov. 30, 2016, Mufti, "Telecommunication Mequipment easuring Pre-Establishment Service Interruptions", 28 pages.
Office action for U.S. Appl. No. 14/815,831, dated Dec. 2, 2016, Mufti et al., "Telecommunications Network Emergency-Call Handover", 13 pages.
Office action for U.S. Appl. No. 14/552,871, dated Feb. 10, 2017, Mufti, "Telecommunication Network Pre-Establishment Service Interruption Response", 23 pages.
Office action for U.S. Appl. No. 14/568,633, dated Apr. 11, 2018, Mufti, "Suppressing Third Party Registration and Third Party Deregistration Actions", 21 pages.
Office action for U.S. Appl. No. 14/568,633, dated Apr. 12, 2017, Mufti, "Suppressing Third Party Registration and Third Party Deregistration Actions", 16 pages.
Office action for U.S. Appl. No. 14/552,871, dated Apr. 19, 2018, Mufti, "Telecommunication Network Pre-Establishment Service Interruption Response", 6 pages.
Office action for U.S. Appl. No. 14/552,945, dated May 18, 2016, Mufti, "Telecommunication Equipment Measuring Pre-Establishment Service Interruptions", 29 pages.
Office action for U.S. Appl. No. 14/815,831, dated May 19, 2016, Mufti et al., "Telecommunications Network Emergency-Call Handover", 15 pages.
Office action for U.S. Appl. No. 14/552,871, dated May 25, 20017, Mufti, "Telecommunication Network Pre-Establishment Service Interruption Response", 27 pages.
Office action for U.S. Appl. No. 14/689,318, dated Jun. 1, 2017, Mufti, "Telecommunications Network Non-Establishment Response", 18 pages
Office Action for U.S. Appl. No. 14/552,945, dated Aug. 31, 2017, Shujaur Mufti, "Telecommunication Equipment Measuring Pre-Establishment Service Interruptions", 35 pages.
Office Action for U.S. Appl. No. 14/552,871, dated Sep. 21, 2017, Mufti, "Telecommunication Network Pre-Establishment Service Interruption Response" 28 pages.
Chinese Office Action dated Dec. 8, 2017 for Chinese patent application No. 201580051477.5, a counterpart foreign application of U.S. Pat. No. 9,699,211.
PCT Search Report and Written Opinion dated Oct. 13, 2015 for PCT Application No. PCT/US15/38634, 11 pages.
PCT Search Report and Written Opinion dated Oct. 15, 2015 for PCT Application No. PCT/US15/38652, 14 pages.
PCT Search Report and Written Opinion dated Oct. 19, 2015 for PCT Application No. PCT/US15/39414, 12 pages.
PCT Search Report and Written Opinion dated Nov. 11, 2015 for PCT Application No. PCT/US15/43467, 12 pages.
PCT Search Report and Written Opinion dated Nov. 27, 2015 for PCT Application No. PCT/US15/43454, 10 pages.
Office Action for U.S. Appl. No. 14/568,633, dated Oct. 18, 2018, Mufti, "Suppressing Third Party Registration and Third Party Deregistration Actions", 27 pages.
Chinese Office Action dated Aug. 19, 2019 for Chinese Patent Application No. 201580040249.8, a counterpart of U.S. Pat. No. 10,039,019, 8 pages.
Chinese Office Action dated Aug. 19, 2019 for Chinese Patent Application No. 201580038224.4, a counterpart of U.S. Pat. No. 10,004,004, 12 pages.
Chinese Office Action dated Jul. 24, 2019 for Chinese Patent Application No. 201580041343.5, a counterpart of U.S. Appl. No. 14/568,633, x pages.
Chinese Office Action dated Aug. 15, 2019 for Chinese Patent Application No. 201580038651.2, a couunterpart of U.S. Pat. No. 10,080,163, 23 pages.
European Office Action dated Jun. 3, 2019 for European Patent Application No. 15830023.6, a counter part of U.S. Pat. No. 9,699,211, 7 pages.
Office Action for U.S. Appl. No. 14/568,633, dated May 16, 2019, Mufti, "Suppressing Third Party Registration and Third Party Deregistration Actions", 22 pages.
Chinese Office Action dated Feb. 6, 2020 for Chinese Patent Application No. 2015800386512, a counterpart of U.S. Pat. No. 10,080,163, 5 pages.
Chinese Office Action dated Feb. 6, 2020 for Chinese Patent Application No. 2015800386512, a counterpart of U.S. Pat. No. 10,080,163, 3 pages.

* cited by examiner

TELECOMMUNICATION NETWORK PRE-ESTABLISHMENT SERVICE INTERRUPTION RESPONSE

CROSS-REFERENCE TO RELATED APPLICATION

This application is a divisional of U.S. patent application Ser. No. 14/552,871, filed Nov. 25, 2014 and entitled "Telecommunication Network Pre-Establishment Service Interruption Response", which is a nonprovisional application of, and claims priority to and the benefit of, U.S. Patent Application Ser. No. 62/024,884, filed Jul. 15, 2014 and entitled "Volte Handover Solutions for Pre-Alerting/Alerting Stage," the entirety of each of which is incorporated herein by reference.

BACKGROUND

Use of packet-switched connections for transmitting synchronous communications, such as voice calls, and data across telecommunication networks is increasing. Such packet-switched connections allow for greater speed and throughput than do circuit-switched connections, and also make packet-switched data from other networks, such as the Internet, more readily available. Most telecommunication networks, however, still utilize access networks that provide circuit-switched connections, such as Global System for Mobile Communications (GSM) networks or Universal Mobile Telecommunications System (UMTS) networks, due to the substantial infrastructure investment needed to expand packet-switched access networks. Such circuit-switched access networks may provide comparable or, at times, better speed and quality than packet-switched access networks for some types of data, including synchronous communications such as full-duplex voice communications.

Because packet-switched access networks are not available to the same extent as circuit-switched access networks, techniques have been developed for switching from one of type of packet-switched access network—e.g., the Long Term Evolution (LTE) access network—to circuit-switched access networks while maintaining continuity for a communication session, such as a voice call. One technique for handover of a communication session from a LTE access network to a circuit-switched access network involves the use of the single radio voice call continuity (SRVCC) standard produced by the Third Generation Partnership Project (3GPP). With SRVCC, an eNodeB of a LTE access network determines that a communication session handover should occur based on a measurement report received from user equipment. The eNodeB communicates this to a mobility management entity (MME), which makes a handover request of a mobile switching center (MSC) server of a circuit-switched access network that is available to the user equipment. The MSC server (MSS) then prepares the circuit-switched access network for the handover, and communicates with an Internet Protocol (IP) multimedia subsystem (IMS) of the telecommunication network, the IMS maintaining continuity for the communication session during the handover. The MSS then sends a handover response to the MME, and the MME instructs the user equipment to connect to the circuit-switched access network to continue the communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a telecommunication network configured to manage a handover of a communication session of user equipment from a first access network to a second access network. The user equipment may be a cellular telephone, such as a feature phone or smartphone. The user equipment may provide a handover request to a server associated with the circuit-switched network, such as a MSS, receive a response from the server indicating that the circuit-switched access network has been prepared for the handover, and instruct the user equipment connect to the circuit-switched access network to continue the communication session. In some examples, a core network device of a telecommunication network, during a pre-establishment phase of a communication session, may receive a handover request for the communication session of user equipment from a first access network of a first type to a second access network of a second, different type; in response to the received handover request, initiate a session transfer; await a rejection of the session transfer within a selected time; and reject the handover in response to the rejection of the session transfer received within the selected time. In some examples, a core network device of a telecommunication network may receive, during a pre-establishment phase of a communication session, an initiation of a session transfer of user equipment for the communication session from a first access network of a first type to a second access network of a second, different type; determine that the initiated session transfer is invalid; transmit a rejection of the session transfer to a handover-control device of the telecommunication network; and transmit a fallback-trigger message to a triggerable system.

Figure 1:
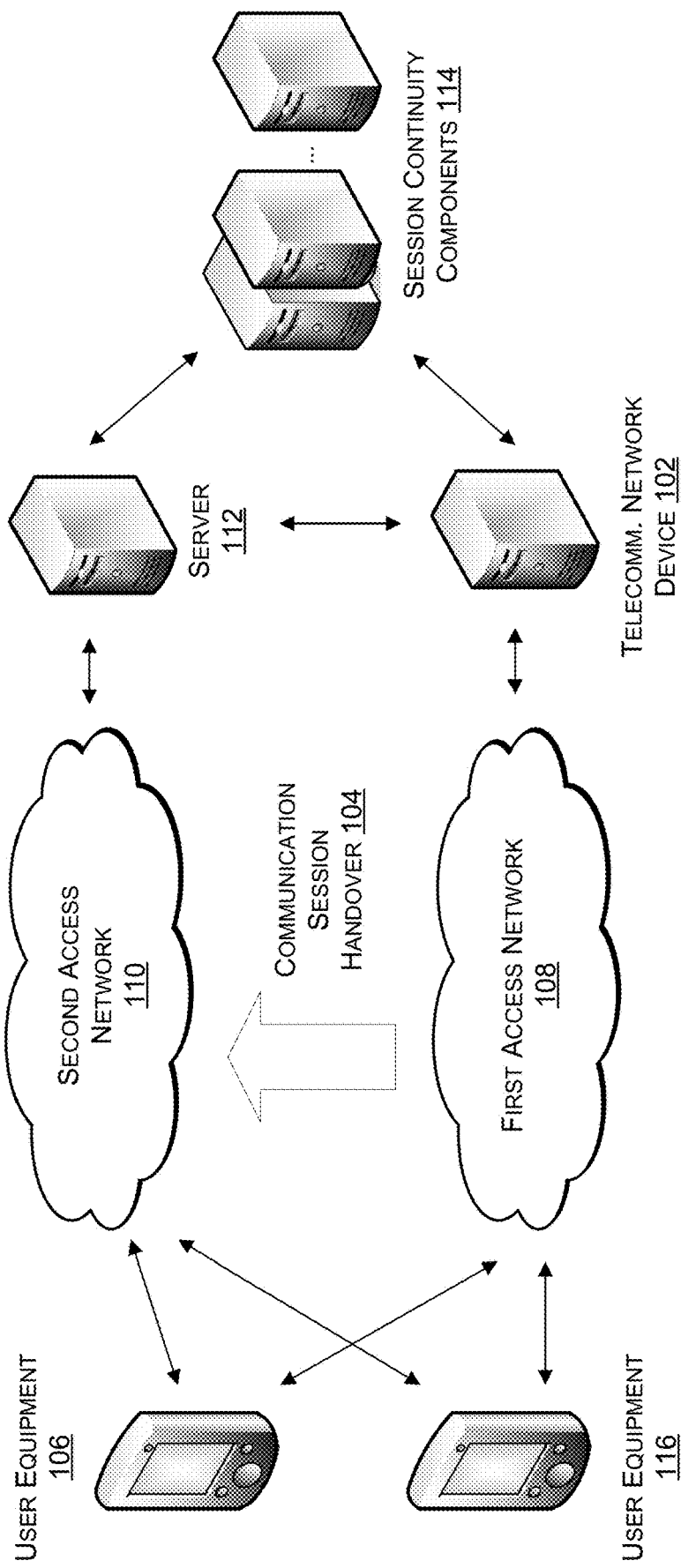
FIG. 1 illustrates an overview of devices involved in a handover of a communication session of user equipment from a packet-switched access network to a circuit-switched access network.

FIG. 1 illustrates an example telecommunication network and shows an overview of devices involved in a handover of a communication session of user equipment from a first access network of a first type to a second access network of a second, different type. The first type may be a packet-switched type (e.g., LTE) and the second type may be a circuit-switched type (e.g., GSM). As shown in FIG. 1, a telecommunication network device 102 may initiate a handover 104 of a communication session of user equipment 106 from first access network 108 to second access network 110. As part of the handover 104, the telecommunication network device 102 (e.g., an MME) may provide a handover request to a server 112 (e.g., an MSS) that is associated with the second access network 110. The server 112 may then prepare the second access network 110 for the handover 104 and communicate with one or more session continuity components 114 to ensure continuity of the communication session during the handover 104. The server 112 then responds to the telecommunication network device 102, and the telecommunication network device 102 instructs the user equipment 106 to connect to the second access network 110 to continue the communication session.

Throughout this disclosure, handover 104 is described in the example of a handover from packet-switched first access network 108 to circuit-switched second access network 110. However, handover 104 is not limited to that example. Handover 104 in various examples can be a handover from a circuit-switched access network to a packet-switched access network, or in general between a first access network of a first type and a second access network of a second, different type.

The user equipment 106 may be any sort device capable of cellular or wireless network communication, such as a cellular phone, a tablet computer, a personal digital assistant (PDA), a personal computer (PC), a laptop computer, a media center, a work station, etc. Example user equipment 106 is described below with reference to FIG. 3.

In some embodiments, the user equipment 106 may have a radio and be configured to tune that radio to licensed wireless spectrum utilized by circuit-switched access networks and packet-switched access networks, such as LTE access networks. The user equipment 106 may also be configured to tune the radio to wireless spectrum utilized by packet-switched access networks, such as GSM access networks or UMTS access networks. When equipped with a single radio, the user equipment 106 may only be connected to one of these access networks at a time.

Figure 2:
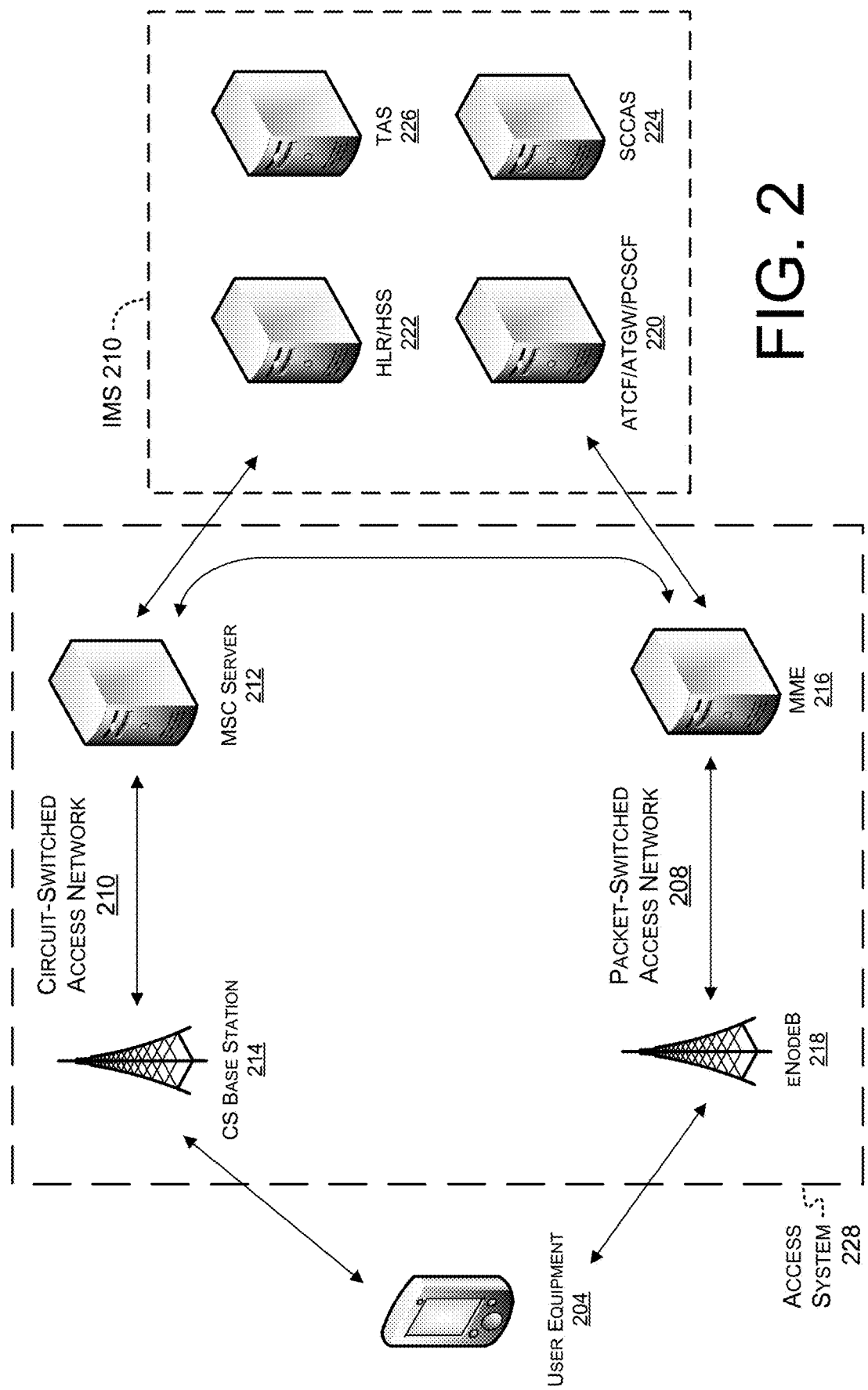
FIG. 2 illustrates an example telecommunication network, including components used to maintain continuity of the communication session during handover of the communication session.
Figure 3:
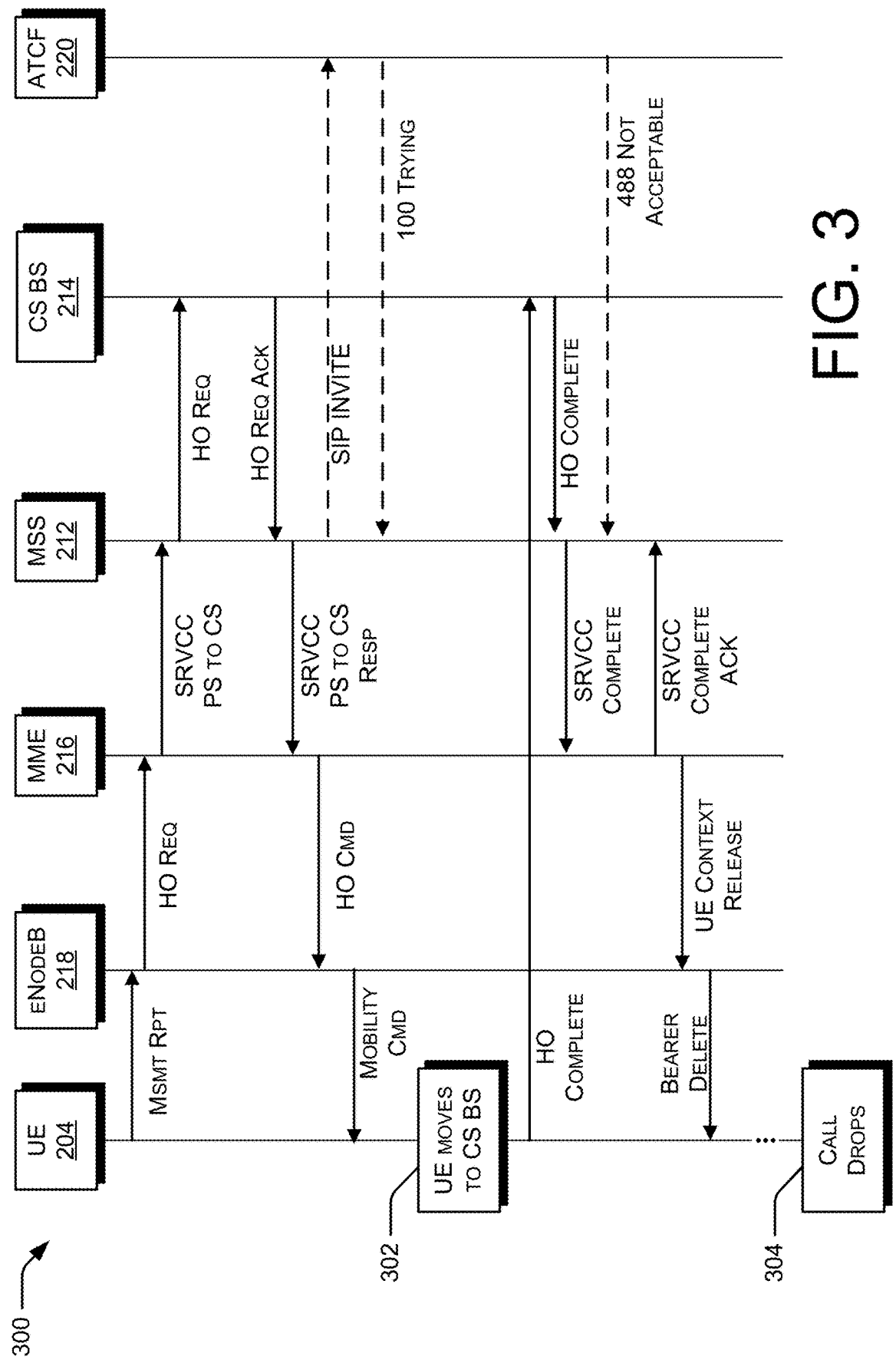
FIG. 3 shows a comparative example of a call flow illustrating an example handoff failure.

The user equipment 106 may further be configured to initiate or receive a communication session, such as a voice call, a video call, or another sort of synchronous communication. Initiation of such communications may involve communication clients and session initiation protocol (SIP) clients to communicate with session continuity components 114 of the telecommunication network. Both the initiation of a communication session and the components involved in the initiation are illustrated in FIGS. 2 and 3 and described in further detail herein. As discussed herein, a communication session may be cancelled, e.g., on a first access network, and re-initiated, e.g., on a second access network. This may be transparent to the user; that is, a person using user equipment 106 may not experience any indication that a cancellation and re-initiation has occurred. Handover 104 may include a cancellation and re-initiation managed by components of the telecommunications network (e.g., telecommunications network device 102, server 112, or session continuity component(s) 114).

In various embodiments, the user equipment 106 may measure access networks that are proximate to the user equipment 106 and provide measurements of those access networks in a measurement report to a device of the telecommunication network, such as telecommunication network device 102. The measurements may include signal strength, packet loss, packet discard, or network congestion. The proximate access networks may include both access networks that are detected by the user equipment 106 and those of neighboring cells, which the user equipment 106 may learn of from the telecommunication network.

The user equipment 106 may initiate the communication session using a connection to the first access network 108. The first access network 108 may be secured using, for example, information from a SIM card of the user equipment 106, or may be non-secured. The first access network 108 connects the user equipment 106 to a telecommunication network. A routing device of the first access network 108 may communicate with a device of the telecommunication network, such as the telecommunication network device 102.

Figure 4:
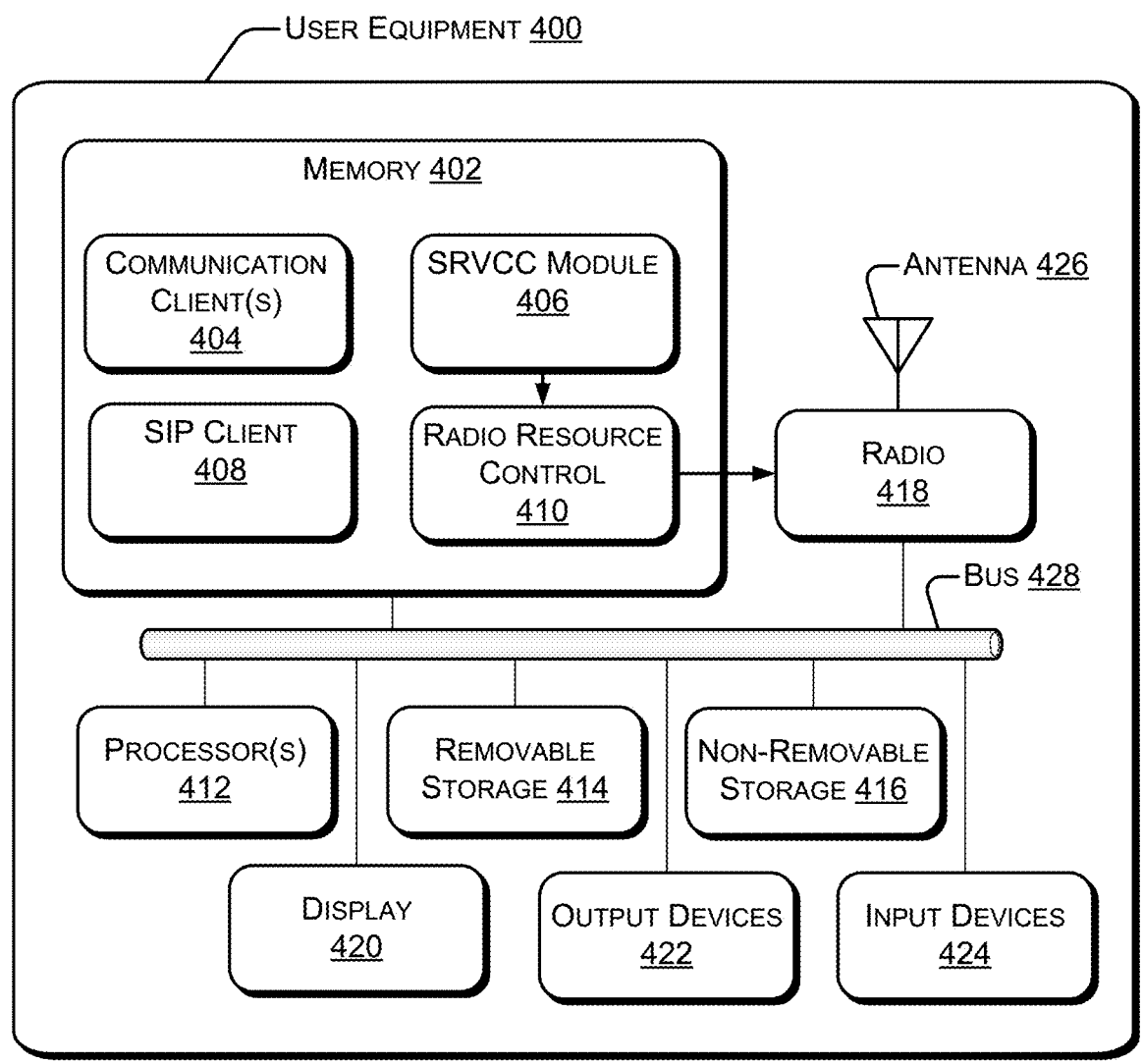
FIG. 4 illustrates a component level view of user equipment capable of connecting to a plurality of access networks, of measuring those access networks, of providing measurement reports, of engaging in a communication session, and of switching access networks during the communication session.

The telecommunication network device 102 may be a gateway device, such as an Evolved Packet Data Gateway (ePDG). An example telecommunication network device 102 is illustrated in FIG. 4 and described below with reference to that figure. Further, the telecommunication network device 102, as well as the server 112 and the session continuity components 114, may each be or include a server or server farm, multiple, distributed server farms, a mainframe, a work station, a personal computer (PC), a laptop computer, a tablet computer, an embedded system, or any other sort of device or devices. In one implementation, one or more of telecommunication network device 102, the server 112, and the session continuity components 114 may represent a plurality of computing devices working in communication, such as a cloud computing network of nodes. Also, the telecommunication network device 102, the server 112, and the session continuity components 114 may each be or include devices of a telecommunication network. Examples of the telecommunication network device 102, the server 112, and the session continuity components 114 are illustrated in FIG. 2 and are described in greater detail with reference to that figure.

In various embodiments, the telecommunication network device 102 may enable the user equipment 106 to initiate the communication session by passing messages to appropriate device(s) of the telecommunication network, such as the session continuity components 114. The telecommunication network device 102 may also receive measurement reports from the user equipment 106 and may apply one or more models, thresholds, rules, or criteria to the measurements included in the measurement reports to determine whether a handover 104 is appropriate. For example, if the signal strength of the first access network 108 falls below a threshold, the telecommunication network device 102 may initiate the handover 104. In other embodiments, the telecommunication network device 102 may select a second access network 110 that is not included in the measurement reports to receive the handover. For example, the measurement reports may include measurements associated with the first access network 108, but no measurements for the second access network 110. The telecommunication network device 102, as part of the telecommunication network, may have access to measurements of the second access network 110, however, and may use those measurements in conjunction with those provided in the measurement reports in making a handover decision.

Upon initiating a handover 104, the telecommunication network device 102 selects a second access network 110 to transition the communication session to. For example, the telecommunication network device 102 may select the second access network 110 based on signal congestion levels of several second access networks included in the measurement report. The telecommunication network device 102 may then determine the server 112 associated with the selected second access network 110 by referencing mappings, such as a table.

As part of the handover 104, the telecommunication network device 102 may send instructions to the user equipment 106 preparing the user equipment 106 for the handover 104. Such instructions may include a directive to automatically tune the radio of the user equipment 106 to the second access network 110 if the user equipment 106 has not heard from the telecommunication network device 102 within a threshold period of time.

The telecommunication network device 102 then sends a handover request, such as an SRVCC packet-switched (PS) to circuit-switched (CS) request. The request may be made over an interface between the telecommunication network device 102 and the server 112. In an example, the telecommunication network device 102 can be or include an MME, which may have an SV interface with the server 112. The handover request may include at least information identifying the user equipment 106, such as an international mobile subscriber identity (IMSI), information identifying the communication session, such as a correlation mobile station international subscriber directory number (C-MSISDN), and an identifier of the session continuity components 114, such as a session transfer number-single radio (STN-SR).

In some embodiments, the server 112 may be an MSS associated with the second access network 110, e.g., a circuit-switched access network. The second access network 110 may be any sort of second access network 110, such as a GSM or UMTS network. The second access network 110 may also be referred to as a universal terrestrial radio network (UTRAN) or a GSM EDGE radio access network (GERAN) and may include a base station or NodeB, as well as a radio network controller (RNC). The second access network 110 may provide circuit-switched connections over a given signal spectrum and may use any sort of air interface, such as a code division multiple access (CDMA), time division multiple access (TDMA), or frequency division multiple access (FDMA) air interface. Communications received by the second access network 110 from the user equipment 106 are transmitted to a server 112 of the telecommunication network, such as an MSS.

Upon receiving a handover request, the server 112 prepares the second access network 110 for the handover 104 by, for example, allocating resources at a base station and RNC of the second access network 110. The server 112 also uses the identifier of the session continuity components 114 included in the handover request to request that the session continuity components perform a session transfer. The session transfer enables the handover 104 to occur without loss of continuity to the communication session.

In various embodiments, the session continuity components 114 represent components of an IMS of the telecommunication network. Examples of such components, and of the session transfer, are described further herein. Upon receiving a session transfer request from the server 112 and performing the session transfer, the session continuity components 114 respond to the server 112, indicating completion of the session transfer.

In further embodiments, upon receiving a response indicating completion of the session transfer, and after preparing the second access network 110 for the handover 104, the server 112 (e.g., an MSS) sends a handover response, such as an SRVCC PS to CS response, to the telecommunication network device 102 (e.g., an MME). The telecommunication network device 102 then instructs the user equipment 106 to tune its radio to the second access network 110 in order to connect to the second access network 110 and continue the communication session. Upon receiving such instructions, the user equipment 106 carries them out, completing the handover 104.

A handover 104 can be initiated at any time during a voice call or other persistent communication session. As noted above, the Session Initiation Protocol (SIP, RFC 3261) can be used to establish and manage communication sessions. A communication session typically passes through several phases over its life. These are described with reference to a voice call in the circuit-switched domain but are not limited thereto. For LTE, the phases are defined in 3GPP TS 24.237 version 12.6.0 Release 12, p. 19 and in 3GPP TS 24.229 version 10.9.0 Release 10, pp. 96-98, or subsequent versions of those standards.

To initiate a communication session, e.g., in response to a user's dialing a phone number, originating user equipment 106 sends a SIP INVITE request via first access network 108 to terminating user equipment 116. This begins a "pre-alerting" phase of the session. The terminating user equipment 116 responds with a SIP response carrying a 180 response code, signifying "Ringing." This begins an "alerting" phase of the session, during which the terminating user equipment 116 provides an indication that a call is incoming. Examples of indications include vibrations and audible ringtones. The SIP response is referred to as a "SIP 180 Ringing response", and likewise for other SIP response codes described herein. A SIP response code ending in "xx", e.g., a SIP 1xx Provisional response, signifies any response of, e.g., class 1 of SIP responses (RFC 3261, § 7.2).

When terminating user equipment 116 accepts the communication session (e.g., a user of device 116 chooses to answer the call), terminating user equipment 116 sends a SIP 200 OK response to originating user equipment 106. This begins an "established" phase of the communication session, during which data can be exchanged between originating user equipment 106 and terminating user equipment 116. In an example, the data includes digitized audio of a voice call. The alerting and pre-alerting phases are referred to collectively as a "pre-establishment phase." The pre-establishment phase corresponds to a SIP "early dialog state" and the established phase corresponds to a SIP "confirmed dialog state" (RFC 3261, § 12).

However, in some telecommunication networks, some telecommunication network devices 102, servers 112, or session continuity components 114 support handovers during the pre-establishment phase ("pre-establishment handovers") and others do not. In an example, server 112, e.g., an MSS, supports pre-establishment handovers, but at least one of the session continuity components 114, e.g., ATCF 220 described below with reference to FIG. 2, does not support pre-establishment handovers. As a result, pre-establishment handovers can terminate in dropped calls (or other prematurely terminated communication sessions) because, e.g., user equipment 106 or 116 transitions between access networks 108, 110 but the session continuity components 114 do not. An example is shown in FIG. 3, discussed below. Handovers can be triggered or required at any time during a communication session, including during the pre-establishment phase, e.g., due to declines in signal strength as user equipment 106, 116 moves. It is therefore desirable to reduce the occurrence of call drops due to pre-establishment handovers.

Example Telecommunication Network

FIG. 2 illustrates an example telecommunication network. User equipment 204 communicates with access system 228 of the telecommunication network, including an MME 216 associated with a packet-switched access network 208 and a MSS 212 associated with a circuit-switched access network 210. IP multimedia subsystem (IMS) 210 communicates with access system 228 and provides media-handling services, e.g., to route video or voice data and to maintain continuity of the communication session during handover of the communication session. The circuit-switched access network 210 may include a CS base station 214 that provides connectivity to the circuit-switched access network. The MME 216 may enable connectivity to the telecommunication network through a packet-switched access network 208, e.g., an LTE access network, which includes an eNodeB 218, e.g., a 4G base station or other access point. The IMS 210 of the telecommunication network may include a number of nodes, such as an access transfer control function (ATCF)/ access transfer gateway (ATGW)/proxy call session control function (PCSCF) 220, a home location register (HLR)/ home subscriber server (HSS) 222, a service call continuity application server (SCCAS) 224, and a telephony application server (TAS) 226.

The telecommunication network may also include a number of devices or nodes not illustrated in FIG. 2. Such devices or nodes may include a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 210 may further include a number of devices or nodes not illustrated in FIG. 2, such as a presence server and one or more call session control functions (CSCF). A core network of the telecommunication network may be a GPRS core network or an evolved packet core (EPC) network, or may include elements from both types of core networks. The telecommunication network may provide a variety of services to user equipment 204, such as synchronous communication routing across a public switched telephone network (PSTN). Further services may include call control, switching, authentication, billing, etc. In at least one example, IMS 210 functions and devices communicate using specific services provided by the access system 228 or elements thereof but are not directly tied to those specific services. For example, IMS 210 devices can intercommunicate using an EPC network, a GSM network, a SONET network, or an Ethernet network.

The devices and networks illustrated in FIG. 2 may be examples of the devices and networks illustrated in FIG. 1 and described above. For instance, the MME 216 may be a telecommunication network device 102, the user equipment 204 may be user equipment 106, the IMS 210 and its components 220-224 may be session continuity components 114, and the MSS 212 may be a server 112. Also, the eNodeB 218 may be an access point for the packet-switched access network 208, and the CS base station 214 may be a base station for the circuit-switched access network 210. Accordingly, the descriptions of the devices and networks of FIG. 1 apply to the devices and networks of FIG. 2.

The devices and networks of FIG. 2 may cooperate to accomplish the handover 104 shown in FIG. 1 and described above. They may also cooperate to accomplish the initialization of a communication session of user equipment 204 and to provide a session transfer number (STN) identifying the IMS 210.

In initializing the communication session, the user equipment 204 must register the communication session with the IMS 210 of the telecommunication network. To do this, the user equipment 204 sends an initiation SIP register request to the IMS 210 via the eNodeB 218 and MME 216. A P-CSCF of the IMS 210 may receive the SIP register request, and may provide the SIP register request to the ATCF/ATGW 220 of the IMS 210. The ATCF/ATGW 220 allocates a session transfer number, such as an STN-SR, and includes the STN-SR in the SIP register request to ensure that the ATCF is included in the signaling path for future SIP requests, such as session transfer requests from MSSs 212. The ATCF/ATGW 220 then sends the SIP register request to an interrogating call session control function (I-CSCF)/ serving call session control function (S-CSCF), which in turn sends the SIP register request to the SCCAS 224. Alternatively, the STN-SR may be allocated by and associated with the SCCAS 224. The SCCAS 224 then sends a pull message to the HLR/HSS 222 to determine whether the user equipment 204 is SRVCC capable and to retrieve an STN-SR stored in the HLR/HSS 222. If the STN-SR received from the HLR/HSS 222 differs from the STN-SR included in the SIP register request, the SCCAS 224 updates the HLR/HSS 222 with the STN-SR included in the SIP register request. The SCCAS 224 may then send a SIP register response to the user equipment 204 to complete the IMS registration of the communication session.

In various embodiments, the STN which identifies the IMS 210 during an attach procedure can be determined by the MME 216, which can perform the location update and receive the STN via an Insert Subscriber Data message from the HLR/HSS 222.

An example handover 104 of a communication session of user equipment 106 from packet-switched access network 208 to a circuit-switched access network 210 is described above. In order to relate an example handover in further detail, and with reference to the devices and networks of FIG. 2, a further example handover is described. In this example, the communication session subject to the handover is a communication session of the user equipment 204 that uses packet-switched access network 208. Such a communication session may, for instance, be a voice-over-LTE (VoLTE) voice call. In the illustrated configuration, access system 228 and IMS 210 have separate handover procedures that operate in parallel to complete a handover.

In various embodiments, the user equipment 204 may send measurement reports to the eNodeB 218. The user equipment 204 can, for example, measure access networks based on measurement gap instructions and include those measurements in the measurement reports. Measurement gap instructions may be received by the user equipment 204 and utilized to create gaps in the communication session and to use those gaps to tune the radio to the different access networks and to obtain measurements for those access networks. The measurement gap instructions may be provided by any node or device of the telecommunication network.

These measurement reports may include measurements of the packet-switched access network 208, e.g., a LTE access network provided by the eNodeB 218, or of a circuit-switched access network 210 provided by the CS base station 214. Alternatively, the measurement reports may include only measurements of a subset of those access networks. Such measurements may include signal strength, packet loss, packet discard, or network congestion. The eNodeB 218 may apply models, thresholds, rules, or criteria to the measurements and may initiate a handover based on the application of those models, thresholds, rules, or criteria to the measurements.

As mentioned above, the MIME 216 may consider measurements for access networks not included in the measurement reports. For example, the measurement reports may include measurements for an LTE or other packet-switched access network 208, but not for the circuit-switched access network 210. The eNodeB 218 may have access to measurements of the circuit-switched access network 210 and may use those measurements, in conjunction with those reported in the measurement reports, in making the handover decision.

Upon initiating the handover, the MIME 216 may select the circuit-switched access network 210 to receive the communication session. Such a selection may also be based on one or more measurement report(s), other measurements known to the telecommunication network, or any combination thereof. The MME 216 may also send instructions to the user equipment 204 to prepare the user equipment for the handover. Such instruction may include, for example, a directive to automatically tune the radio of the user equipment to the circuit-switched access network 210.

The MME 216 may then provide a handover request, e.g., an SRVCC PS to CS request. The handover request may include an IMSI for the user equipment 204, the STN-SR, a C-MSISDN for the communication session, a generic source to target transparent container, a mobility management (MM) context, and an emergency indication. The MME 216 may make the handover request of the MSS 212.

In various embodiments, upon receiving the handover request, the MSS 212 performs resource allocation with the target CS base station 214 by exchanging handover request/acknowledgement messages with the CS base station 214. Once the MSS 212 has determined that the CS base station 214 can accept user equipment 204, the MSS 212 then sends a handover response to the MME 216. Such a handover response may be an SRVCC PS to CS response, which may include a target to source transparent container. The MME 216 then sends a handover command message to the user equipment 204 via eNodeB 218, instructing the user equipment 204 to tune its radio to the circuit-switched access network 210 of the CS base station 214. Handover detection then occurs at the CS base station 214, and the CS base station 214 sends a handover complete message to the MSS 212. This concludes handover of access system 228.

The MSS 212 also initiates a session transfer by sending a SIP INVITE request, which includes the STN-SR, to the IMS 210, e.g., to ATCF 220. The STN-SR is used to direct the SIP INVITE request to the correct component of IMS 210.

In at least one example, the STN-SR is associated with the ATCF 220. The ATCF 220 receives the SIP INVITE request and switches the session from the source access leg, i.e., network port(s) or other connection(s) to user equipment 204 via packet-switched access network 208, to the CS access leg, i.e., network port(s) or other connection(s) to user equipment 204 via circuit-switched access network 210. ATCF 220 then sends a SIP INVITE request to the SCCAS 224 to inform the SCCAS 224 of the switch and cause it to release the source access leg, and responds to the SIP INVITE request of the MSS 212, completing the session transfer. The media remains anchored at the ATGW 220 during the session transfer, and the conversation partner device is not made aware of session transfer. This concludes handover of the IMS 210, which is in general not aware of the state of access system 228 or any other transport underlying the IMS 210. Similarly, the underlying transport (e.g., access system 228) is in general not aware of the state of the IMS 210.

Still referring to FIG. 2, in some examples, MME 216 is communicatively connected with packet-switched access network 208. MME 216 may be configured to receive a first handover request for handover of a communication session of user equipment 204 (either originating, MO, or terminating, MT) during a pre-establishment phase of the communication session. The first handover request may be provided, e.g., by eNodeB 218 in response to a measurement report from user equipment 204. MME 216 may provide a second handover request. The second handover request may be a copy, in whole or in part, of the first handover request or may be another request based on or provided in response to the first handover request.

MSS 212 is communicatively connected with circuit-switched access network 210. MSS 212 may be configured to receive the second handover request from MME 216. MSS 212 may be further configured to allocate second access network resources for the communication session, and to initiate a session transfer, e.g., by transmitting a SIP INVITE to ATCF 220.

ATCF 220 is an example of a media-control server. ATCF 220 or another media-control server may be responsive to the initiated session transfer to determine that the session transfer is invalid during the pre-establishment phase and to reject the session transfer. ATCF 220 or another media-control server may reject the session transfer, e.g., by providing a Session Initiation Protocol (SIP) 488 Not Acceptable message to MSS 212.

MSS 212 may be further responsive to the rejection of the session transfer within a selected time following the initiation of the session transfer to reject the second handover request, e.g., by providing an SRVCC PS to CS rejection message to MME 216. MME 216 may be responsive to the rejection of the second handover request to reject the first handover request, e.g., by informing eNodeB 218 or other device(s) or network component(s) that the first handover request has been rejected. Various examples of this handover rejection are discussed below with reference to FIGS. 9-13. In some examples, MSS 212 may include a timer configured to measure a response time substantially between the initiation of the session transfer and the rejection of the session transfer. MSS 212 may be configured to determine whether the response time is less than the selected time.

In some of these examples, when LTE signal strength (SS) drops during the pre-alerting or alerting phases of a VoLTE call, or the LTE network is unable to continue handling the call or other communication session, components of the core network, e.g., MSS 212, carry state information from the IMS 210 to the access system 228. In various examples described above, MSS 212 rejects handover in access system 228 if the ATCF 220 or other media-control server does not support the handover in IMS 210. Once the handover is rejected, user equipment 204, TAS 226, or other network components may re-initiate the communication session on a different network, so that the handover is not performed during the alerting or pre-alerting phase and can succeed. In some examples discussed below with reference to FIGS. 6-8, 12, and 13, ATCF 220 may inform originating user equipment 204 or TAS 226 if the handover is not supported by IMS 210, and the device so informed can perform circuit-switched fallback (CSFB) or another call-reinitiation protocol.

For clarity, the above discussion is in the context of a handover from packet-switched access network 208 to circuit-switched access network 210. However, corresponding components and functions described above can be used for handovers from circuit-switched access network 210 to packet-switched access network 208, or for handovers between other types of networks. Example network types may include WI-FI networks carrying voice-over-Internet-Protocol (VoIP) communication sessions, wireline networks such as Ethernet, or wireless networks such as those used for communications via non-geostationary satellites. Throughout this disclosure, the noun "call" is synonymous with "communication session."

In some examples, user equipment 204 is originating user equipment of the communication session. The media control server, e.g., ATCF 220, is configured to reject the session transfer by transmitting a session-transfer-rejection message to the MSS 212, e.g., a SIP 488 Not Acceptable response, and a fallback-trigger message to user equipment 204, e.g., a SIP 500 Internal Server Error response. Examples are discussed below with reference to FIGS. 6, 7, and 12.

In some examples, the telecommunication network further includes an application server (AS). In the example shown, IMS 210 includes a telephony application server (TAS) 226. In these examples, user equipment 204 is a terminating user equipment of the communication session. In these examples, the media control server (e.g., ATCF 220) is configured to reject the session transfer by transmitting a session-transfer-rejection message to the MSS 212, e.g., a SIP 488 Not Acceptable response, and a fallback-trigger message to the AS, e.g., a SIP 500 Internal Server Error response. Examples are discussed below with reference to FIGS. 6, 8, and 13.

FIG. 3 shows a comparative example call flow 300 illustrating an example handoff failure in prior systems. In FIG. 3 and other call flows herein, boxes across the top and vertical lines descending from those boxes represent user equipment 400, FIG. 4, or telecommunication network devices 500, FIG. 5 (collectively, "nodes"). Time increases down the page. Arrows between the vertical lines represent messages between nodes. Moreover, for this and other call flows herein, some components and messages are omitted for brevity. In the illustrated example, eNodeB 218 triggers a handoff based on a measurement report from user equipment 204, as discussed below.

As discussed above, some telecommunication networks, and specifically some implementations of IMS 210, do not support SRVCC during the pre-establishment phase. In these networks, the handover from eNodeB 218 to CS base station 214 in access system 228 can succeed but the IMS 210 handover can fail, resulting in a dropped call. In FIG. 3, signals related to the access system 228 are shown solid; signals related to the IMS 210 are shown dashed. "Req" stands for "request" and "Ack" stands for "acknowledgement." "Cmd" stands for "command." "Resp" stands for "response."

As discussed above, in the telecommunications network, user equipment 204 ("UE"; also referred to as a "user device") provides a measurement report ("Msmt Rpt") to eNodeB 218. The measurement report can indicate that LTE signal strength (SS) is below a selected lower limit. This can occur, e.g., when UE 204 is near the edge of the coverage area of eNodeB 218, or when UE 204 is in a building or otherwise shadowed from signals from eNodeB 218.

In response to the measurement report, eNodeB 218 requests a handover ("HO Req") from MME 216. MME 216 sends the SRVCC PS to CS request to MSS 212, which in turn negotiates with the CS base station 214 ("CS BS") via the "HO Req" and "HO Req Ack". The Ack is passed back to MME 216 ("SRVCC PS to CS Resp"), which commands eNodeB 218 to handover the call ("HO Cmd"). The eNodeB 218 then commands the UE 204 to switch radios from packet-switched frequencies and protocols to circuit-switched frequencies and protocols ("Mobility Cmd"). At block 302, the UE 204 terminates communication with eNodeB 218 and commences communicating with CS BS 214. UE 204 then advises CS BS 214 that the handover is complete ("HO Complete"). CS BS 214 in turn advised MSS 212 ("HO Complete"), which advises MME 216 ("SRVCC Complete") and receives confirmation from MME 216 ("SRVCC Complete ACK"). MME 216 then directs eNodeB 218 to release resources formerly associated with the communication session ("UE Context Release"). ENodeB 218, in response, directs originating UE 204 to release resources dedicated to the transfer of streaming data, e.g., of voice or video ("Bearer Delete" message).

In parallel with the handover in the telecommunication network, the IMS 210 is conducting a handover. When MSS 212 receives the HO REQ ACK from the CS BS 214, MSS 212 sends a SIP INVITE to ATCF 220 in IMS 210, FIG. 2. The SIP INVITE directs IMS 210 to change the data flow in the communication session from the PS access network 208 to the CS access network 210. ATCF 220 responses with a SIP 100 Trying response, indicating the transfer has begun but is not yet complete. As indicated in 3GPP TS 23.216 version 12.1.0 Release 12, p. 37, Note 4, MSS 212 is not required to wait for a SIP 2xx Success response before sending the SRVCC PS to CS Resp to MME 216. This is because IMS 210 is independent of the access network carrying the multimedia traffic (3GPP TS 23.228 version 11.10.0 Release 11, p. 23).

In the example shown, ATCF 220 is not able to accept the handover, e.g., because UE 204 is in an alerting or pre-alerting stage. Accordingly, ATCF 220 sends a SIP 488 Not Acceptable response to MSS 212. However, in this example, MSS 212 does not receive the SIP 488 until after UE 204 has moved to the CS BS 214. Accordingly, UE 204 is communicating via circuit-switched access network 210 but IMS 210 is still communicating via packet-switched access network 208. The result is, e.g., silence on the line during a voice call. After a timeout period with no communication, UE 204 drops the call or other communication session (block 304).

Example Devices

FIG. 4 illustrates a component level view of user equipment 400 capable of connecting to a plurality of access networks, of measuring those access networks, of providing measurement reports, of engaging in a communication session, and of switching access networks during the communication session. User equipment 400 may be any sort of user equipment, such as user equipment 106, 116, or 204. As illustrated, user equipment 400 comprises a system memory 402 storing communication client(s) 404, SRVCC module 406, SIP client 408, and radio resource control 410. Also, user equipment 400 includes processor(s) 412, a removable storage 414, a non-removable storage 416, radio 418, a display 420, output device(s) 422, input device(s) 424, and one or more antenna(s) 426 connected to radio 418. Processor 412, radio 418, system memory 402, and other illustrated components of user equipment 400 can be communicatively coupled via bus 428, e.g., a PCI or other computer bus.

In various embodiments, system memory 402 is volatile (such as RAM), non-volatile (such as ROM, flash memory, etc.) or some combination of the two. The communication client(s) 404 stored in the system memory 402 may enable user equipment 400 to initiate and carry on communication sessions. The communication client(s) 404 may include voice call handlers, video calling clients, gaming and media clients, etc. The communication client(s) 404 may utilize a policy, preferences, etc. in determining which of a number of available access networks the communication client(s) 404 should use in initiating communication sessions. For example, the communication client(s) 404 may utilize a policy or preference that prefers LTE access networks to GSM access networks, and GSM access networks to other circuit-switched access networks.

The SRVCC module 406 may perform a number of functions, such as interfacing with the radio 418 through the radio resource control 410, receiving instructions, such as measurement gap instructions, instructions preparing user equipment 400 for a handover, and instructions to complete a handover by tuning the radio 418, performing measurements of access networks, generating measurement reports that include the measurements, and providing the measurement reports to the telecommunication network. Further details of functions that may be performed by SRVCC module 406 are discussed below with reference to FIGS. 7 and 12.

The SIP client 408 may participate with the communication client(s) 404 in initiating a communication session by, for example, formulating a SIP REGISTER request and sending the SIP REGISTER request to the telecommunication network.

The radio resource control 410 may, for example, be a radio resource control layer of user equipment 400 and may interact with the radio 418 and other modules and components of user equipment 400 in order to tune the radio 418 and communicate using the radio 418.

In some embodiments, the processor(s) 412 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

User equipment 400 also includes additional data storage devices (removable and/or non-removable) such as, for example, magnetic disks, optical disks, or tape. Such additional storage is illustrated in FIG. 4 by removable storage 414 and non-removable storage 416. Tangible, non-transitory computer-readable media may include volatile and nonvolatile, removable and non-removable media implemented in any method or technology for storage of information, such as computer readable instructions, data structures, program modules, or other data. System memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by user equipment 400. Any such tangible computer-readable media may be part of user equipment 400.

In some embodiments, the radio 418 includes any sort of radio known in the art. For example, radio 418 may be a radio transceiver that performs the function of transmitting and receiving radio frequency communications. The radio interface may facilitate wireless connectivity between user equipment 400 and various cell towers, base stations and/or access points of access networks, e.g., packet-switched or circuit-switched networks.

In various embodiments, the display 420 is a liquid crystal display, organic light-emitting diode (OLED) display, or any other type of display commonly used in telecommunication devices. For example, display 420 may be a touch-sensitive display screen, and can then also act as an input device or keypad, such as for providing a soft-key keyboard, navigation buttons, or the like.

In some embodiments, the output devices 422 include any sort of output devices known in the art, such as a display (already described as display 420), speakers, a vibrating mechanism, or a tactile feedback mechanism. Output devices 422 also include ports for one or more peripheral devices, such as headphones, peripheral speakers, or a peripheral display.

In various embodiments, input devices 424 include any sort of input devices known in the art. For example, input devices 424 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
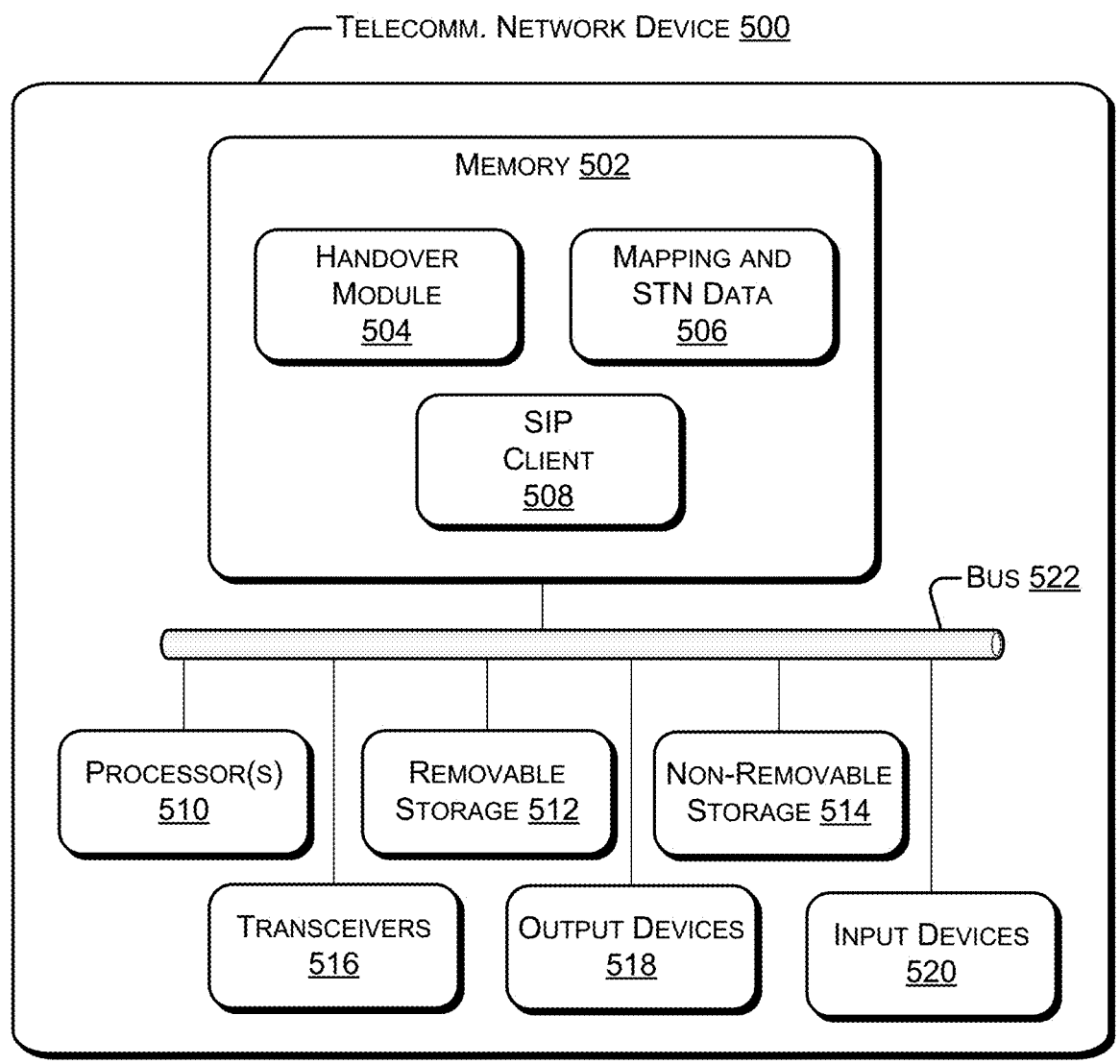
FIG. 5 illustrates a component level view of a telecommunication network device capable of initiating and managing a handover of a communication session of user equipment, e.g., from a packet-switched access network to a circuit-switched access network.

FIG. 5 illustrates a component level view of a telecommunication network device 500 capable of initiating and managing a handover of a communication session of user equipment from a packet-switched access network to a circuit-switched access network. The telecommunication network device 500 may be any sort of user equipment, such as telecommunication network device 102, MSS 212 or MME 216. As illustrated, the telecommunication network device 500 comprises a system memory 502 storing a handover module 504, mappings and STN data 506, and a SIP client 508. Also, the telecommunication network device 500 includes processor(s) 510, a removable storage 512, a non-removable storage 514, transceivers 516, output device(s) 518, and input device(s) 520, any or all of which can be communicatively connected via bus 522.

In various embodiments, system memory 502 is volatile (such as RAM), non-volatile (such as ROM, flash memory, etc.) or some combination of the two. The handover module 504 stored in the system memory 502 may perform a number of functions, including initiating a handover of a communication session based on measurement reports, selecting a circuit-switched access network for the handover, providing a handover request to a server associated with the circuit-switched access network, either directly or through an MME, receiving a handover response, and instructing user equipment to connect to the circuit-switched access network to complete the handover. The handover module 504 may also provide measurement gap instructions to user equipment 500 and instruct user equipment 500 to prepare for a handover. Further details of functions that may be performed by handover module 504 are discussed below with reference to FIGS. 6-13.

The mapping and STN data 506 may include mappings of circuit-switched access networks to servers, such as MSSs, and mappings of proxy call session control functions (P-CSCFs) to ATCFs and STN-SRs.

The SIP client 508 may enable user equipment to perform a SIP registration for a communication session with an IMS or other session continuity components.

In some embodiments, the processor(s) 510 is a central processing unit (CPU), a graphics processing unit (GPU), or both CPU and GPU, or any other sort of processing unit described above with reference to processor 412.

The telecommunication network device 500 also includes additional data storage devices (removable and/or non-removable) such as, for example, magnetic disks, optical disks, or tape. Such additional storage is illustrated in FIG. 5 by removable storage 512 and non-removable storage 514. System memory 502, removable storage 512 and non-removable storage 514 are all examples of computer-readable storage media. Tangible computer-readable media and computer-readable storage media can be as discussed above with reference to removable storage 414 and non-removable storage 416.

In some embodiments, the transceivers 516 include any sort of transceivers known in the art. For example, transceivers 516 may include a radio transceiver that performs the function of transmitting and receiving radio frequency communications. Also, or instead, the transceivers 516 may include other wireless or wired connectors, such as Ethernet connectors or near-field antennas. The transceivers 516 may facilitate connectivity between a public network, such as packet-switched access network 208, and one or more other devices of a telecommunication network.

In some embodiments, the output devices 518 include any sort of output devices known in the art, such as a display, speakers, a vibrating mechanism, or a tactile feedback mechanism. Output devices 518 also include ports for one or more peripheral devices, such as headphones, peripheral speakers, or a peripheral display.

In various embodiments, input devices 520 include any sort of input devices known in the art. For example, input devices 520 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 6:
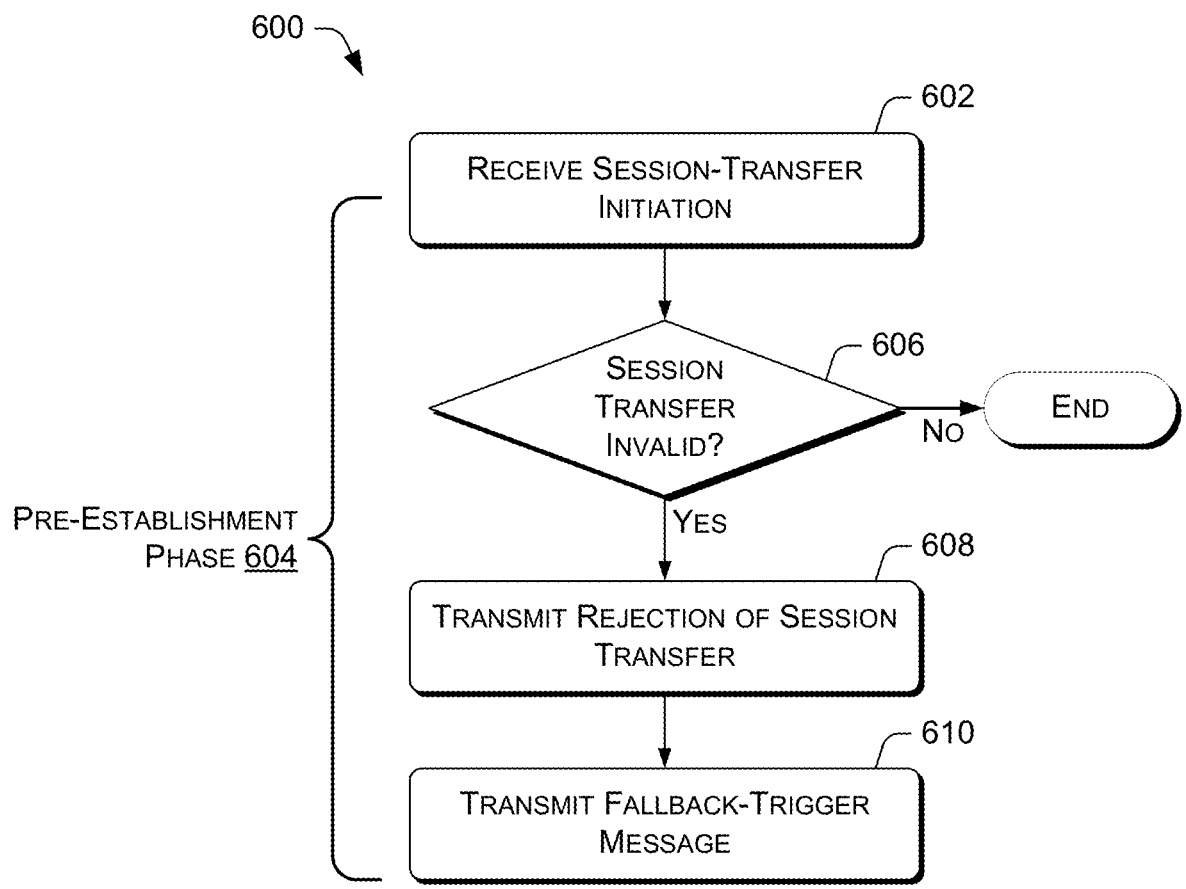
FIG. 6 illustrates an example process performed by a telecommunications network device for maintaining continuity of a communication session during, e.g., the alerting or pre-alerting phases.
Figure 8:
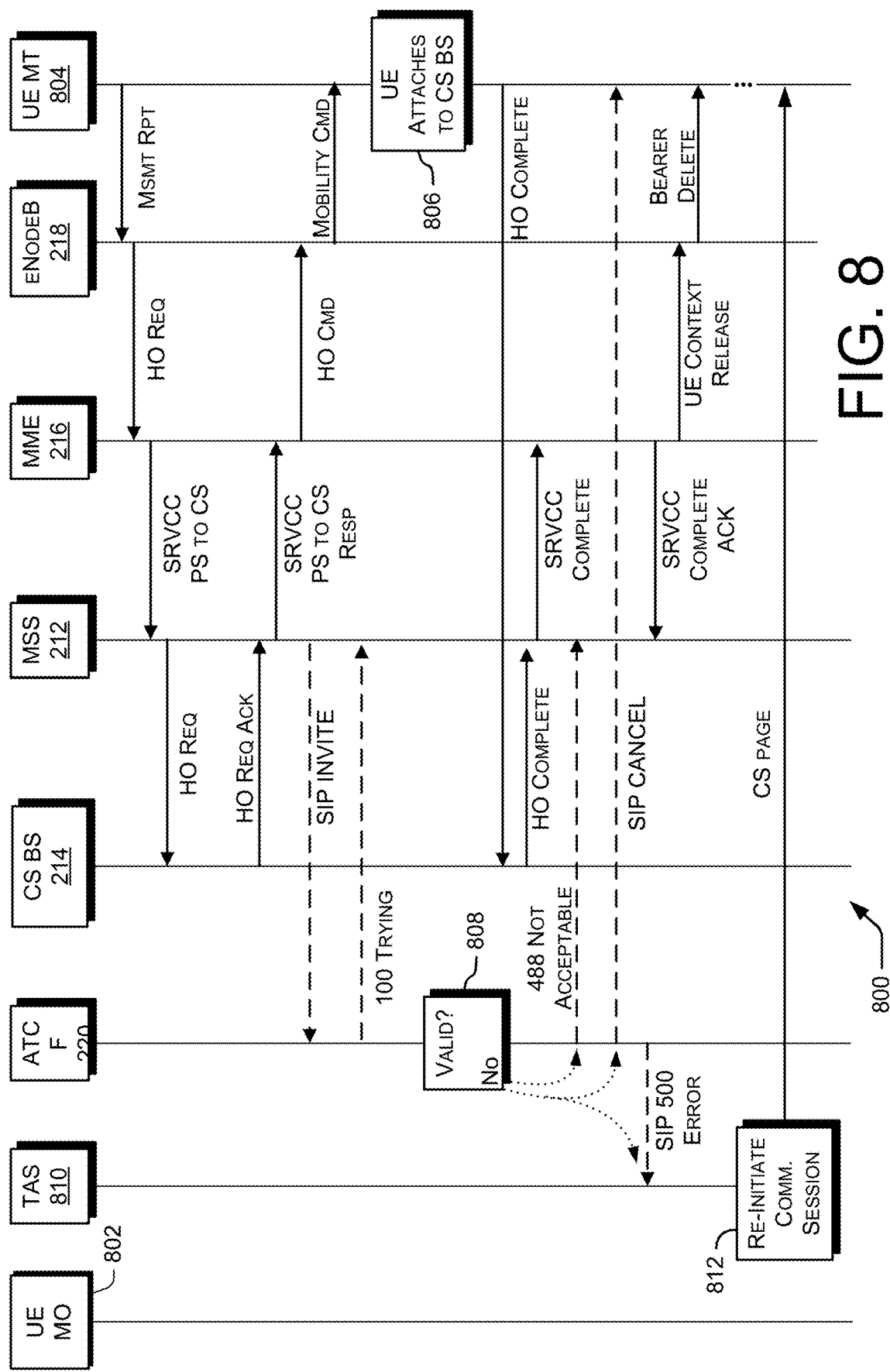
FIG. 8 is a call flow showing an example of the process shown in FIG. 6.
Figure 9:
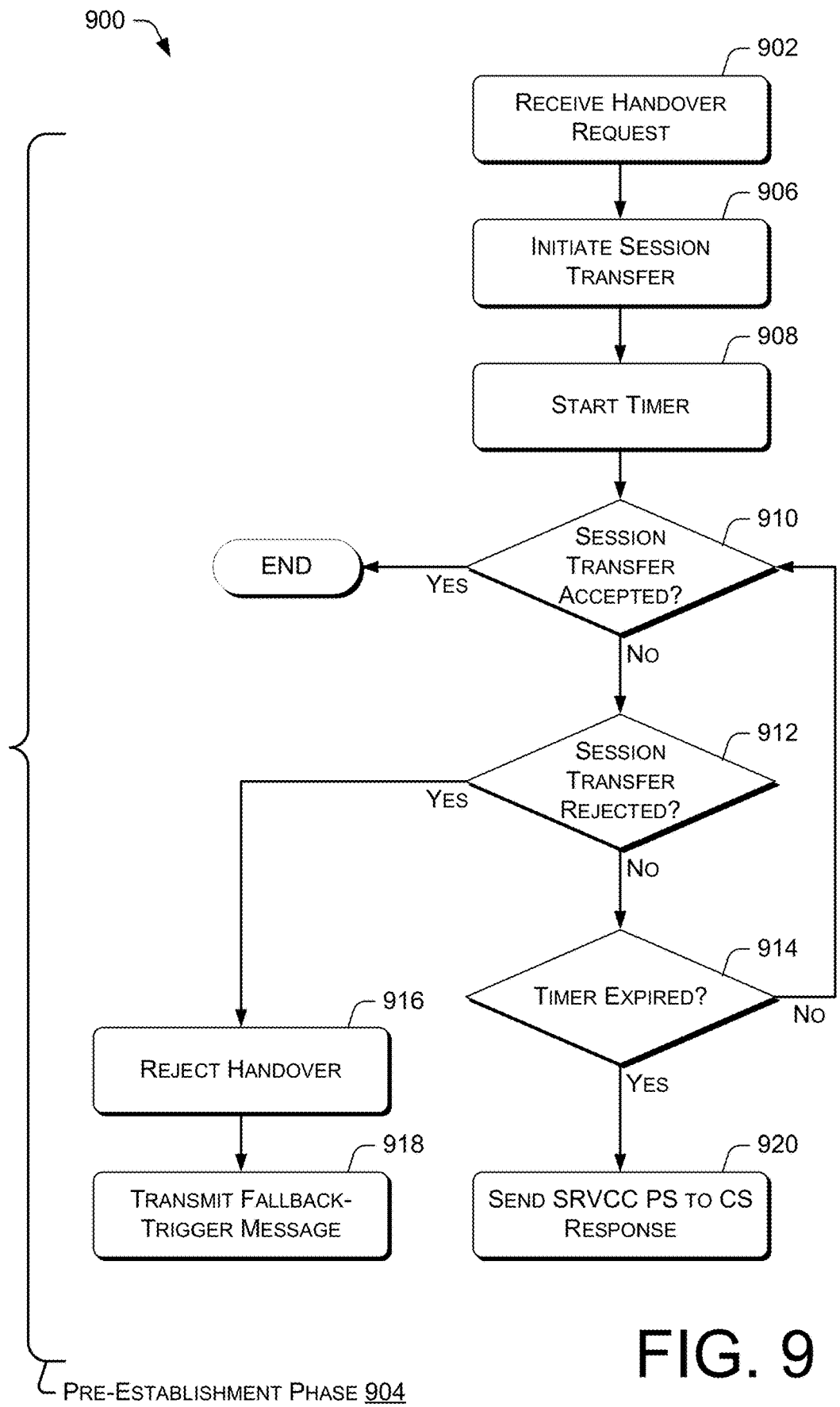
FIG. 9 illustrates an example process performed by a telecommunications network device for maintaining continuity of a communication session during, e.g., the alerting or pre-alerting phases.

FIGS. 6 and 9 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Similarly, the order of data exchanges shown in example call flows of FIGS. 7, 8, and 10-13 is not intended to be construed as a limitation.

FIG. 6 illustrates an example process 600 performed by a core network device of a telecommunications network for maintaining continuity of a communication session during, e.g., the alerting or pre-alerting phases. In some examples, the core network device is ATCF 220, FIG. 2, or another media-control server.

The process includes, at 602, receiving an initiation of a session transfer of user equipment for the communication session from a first access network of a first type to a second access network of a second, different type. In some examples, the first type is a packet-switched type and the second type is a circuit-switched type. The initiation may include a SIP INVITE or other message received by the core network device. The initiation may be received during a pre-establishment phase 604 of a communication session.

At 606, the core network device determines whether the initiated session transfer is invalid. If so, the next block is block 608. If not, the process may terminate.

At 608, the core network device transmits a rejection of the session transfer to a handover-control device of the telecommunication network. In some examples, the handover-control device may be MSS 212. In some examples, the rejection of the session transfer may include a SIP 488 Not Acceptable response or another SIP 4xx Client Failure or SIP 5xx Server Failure response. The core network device may transmit one or more rejection(s) to one or more set(s) of one or more recipient(s) each.

At 610, the core network device transmits a fallback-trigger message to a triggerable system. The fallback-trigger message may include, e.g., a SIP CANCEL request or a SIP 500 Internal Server Error response. In some examples, the triggerable system may respond to the fallback-trigger message by commencing a re-initiation of the communication session. The core network device may transmit one or more fallback-trigger message(s) to one or more set(s) of one or more recipient(s) each.

The core network device may also transmit additional signal(s) to other set(s) of recipient(s) indicating that the session transfer is being rejected. An example is discussed below with reference to block 808, FIG. 8.

Figure 7:
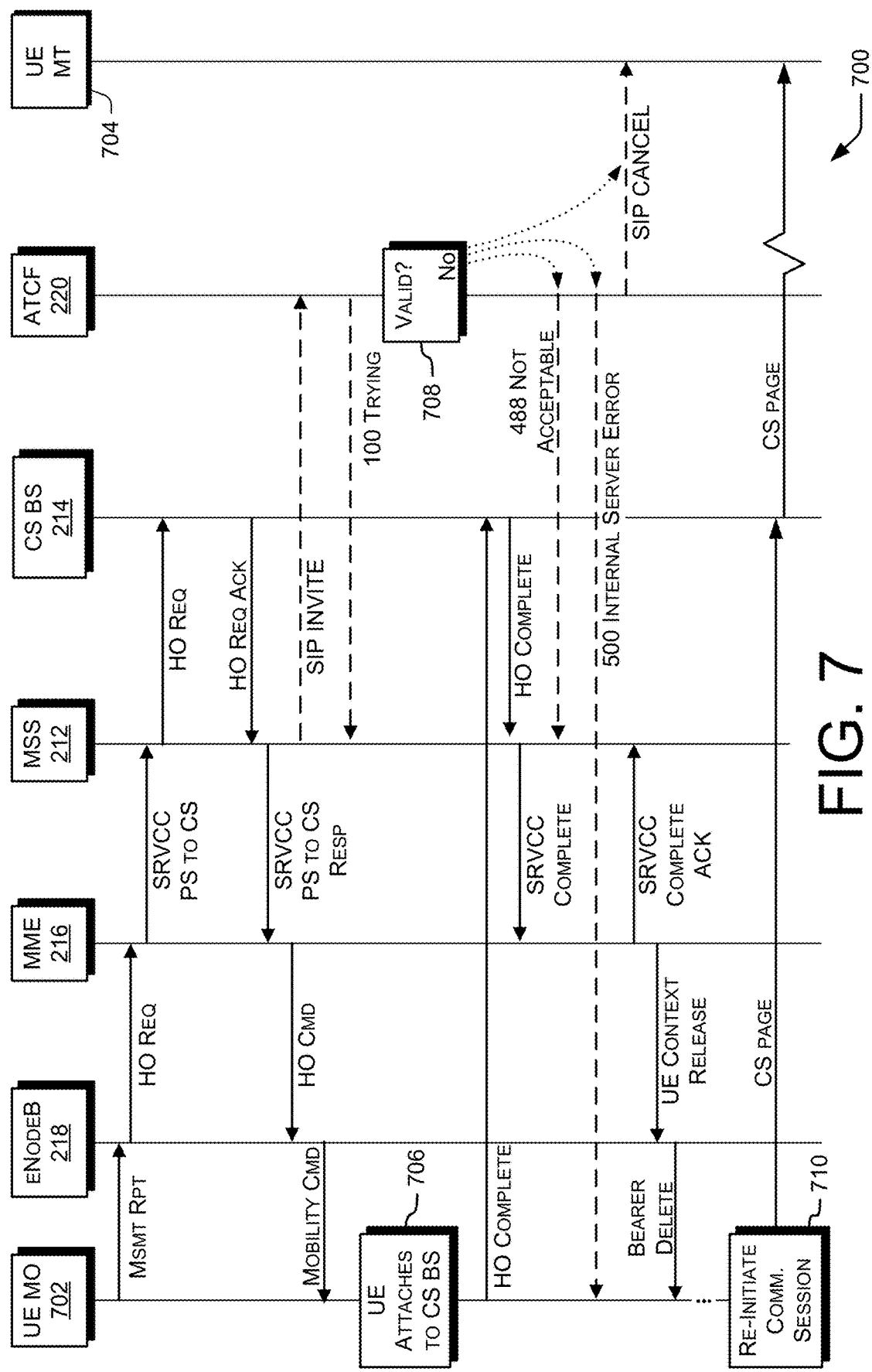
FIG. 7 is a call flow showing an example of the process shown in FIG. 6.

FIG. 7 is a call flow 700 showing an example of the process shown in FIG. 6. The call flow of FIG. 7 is between an originating UE 702 ("UE MO") and a terminating UE 704. Originating UE 702 has placed the call or otherwise initiated the communication session. Terminating UE 704 is the target of the communication session. ENodeB 218, MME 216, MSS 212, CS base station (BS) 214, and ATCF 220 are as described above with reference to FIG. 2. Communications with components of IMS 210 are shown dashed for clarity.

In comparative call flow 300, discussed above, eNodeB 218 triggers the handover (sends the HO Req) regardless of whether IMS 210 is capable of supporting the handover. In the illustrated inventive call flow 700, ATCF 220 sends a fallback-trigger signal (a SIP 500 response) to originating UE 702. Originating UE 702 may, in response, re-initiate the communication session to the second access network (at 710) whether or not access system 228 has completed handover procedures. In this way, even if ATCF 220 does not support handover during the pre-establishment (alerting or pre-alerting) state, the communication session can be established on the second access network.

As shown, originating UE 702 sends a measurement report, which triggers a handover request and a SIP INVITE message from MSS 212, as discussed above with reference to FIG. 3. The handover of access system 228 can proceed as shown in FIG. 3. At 706, originating UE 702 attaches to CS BS 214. In some examples, originating UE 702 supports dual attach, so the connection to eNodeB 218 is not broken at 706.

At 708, ATCF 220 determines whether the handover request is valid or invalid. As indicated by the stippled arrows, if the handover request is invalid, ATCF 220 may take several actions. ATCF 220 may send a SIP 488 Not Acceptable response to MSS 212. This is described above with reference to FIG. 3. The SIP 488 response is an example of a rejection of a session transfer sent to a handover-control device of the telecommunications network. ATCF 220 may also send a SIP CANCEL or other related message to terminating UE 704. Terminating UE 704 may then, e.g., release resources associated with the communication session.

ATCF 220 may also send a SIP 500 Internal Server Error response to originating UE 702. This is an example of a fallback-trigger message (the SIP 500 response) sent to a triggerable system, namely user equipment and, as shown, originating UE 702. Specifically, in this example, the handover-control device is a mobile switching center server (MSS), the triggerable system is user equipment, and the user equipment is an originating user equipment of the communication session. Upon receipt of the SIP 500 response via the still-existing connection to eNodeB 218, at 710, originating UE 702 may re-initiate the communication session via CS BS 214. In the illustrated example, originating UE 702 re-initiates the communication session by sending a CS page via CS BS 214 to terminating UE 704. As indicated by the break-line (zig-zag) symbol, the CS page may pass through one or more core-network device(s) or access-network device(s) (omitted for brevity) before reaching terminating UE 704.

In some examples, processes described herein provide best-effort reconnection or handover services. In the illustrated example using dual-attach originating UE 702, if the SIP 500 response reaches originating UE 702 before the Bearer Delete does, originating UE 702 will re-initiate the communication session in response (block 710). If the Bearer Delete reaches originating UE 702 before the SIP 500 response, originating UE 702 may not receive the SIP 500 response. In such situations other timeouts or recovery mechanisms may be used.

FIG. 8 is a call flow 800 showing an example of the process shown in FIG. 6. The call flow of FIG. 8 is between an originating UE 802 ("UE MO") and a terminating UE 804 ("UE MT"). ENodeB 218 requests a handover ("HO Req") in response to a measurement report from user equipment, in this example terminating UE 804. In response, MSS 212 initiates a session transfer by sending a SIP INVITE to ATCF 220. The access-network handover proceeds as described above. At 806, terminating UE 804 attaches to CS BS 214.

At 808, ATCF 220 determines whether the initiated session transfer is valid. If not, as indicated by the dotted arrows, ATCF 220 can take various actions. ATCF 220 may transmit a SIP 488 Not Acceptable response or other rejection of the session transfer to MSS 212 or another handover-control device. ATCF 220 may transmit a SIP 500 Internal Server Error response or another fallback-trigger message to telephony application server (TAS) 810 or another triggerable system. Moreover, ATCF 220 may transmit a SIP CANCEL to the terminating UE 804 as an additional signal indicating that the session transfer is being rejected.

At 812, TAS 810, in response to the fallback-trigger message, re-initiates the communication session via the second access network (e.g., a CS network). In the example shown, TAS 810 may transmit a CS page to terminating UE 804 via circuit-switched access network 210. In some examples, terminating UE 804 may receive the CS page even if the bearer was deleted and the terminating UE 804 did not receive the SIP CANCEL. Fallback triggering may therefore provide reliability of reconnections in the event of handovers of terminating UE 804.

FIG. 9 illustrates an example process 900 performed by a core network device for maintaining continuity of a communication session during, e.g., the alerting or pre-alerting phases. In some examples, the core network device is a mobile switching center server, e.g., MSS 212.

The process includes, at 902, the core network device receiving a handover request for the communication session of user equipment from a first access network of a first type, e.g., packet-switched, to a second access network of a second, different type, e.g., circuit-switched. The handover request is received during a pre-establishment phase 904 of the communication session. The handover request can include, e.g., an SRVCC PS to CS request from MME 216.

At 906, in response to the received handover request, the core network device initiates a session transfer. In some examples, the core network device may transmit a SIP INVITE to a device of IMS 210, e.g., ATCF 220.

At 908, the core network device starts a timer, records a current time, or otherwise establishes a time base for subsequent blocks. Block 908 may be followed by block 910 or block 912.

At 910, the core network device may determine whether the session transfer has been accepted. If so, process 900 may terminate. In some examples, the core network device may determine that the session transfer has been accepted if the core network device has received a SIP 2xx Successful response, e.g., from a media control server such as ATCF 220. If the session transfer has not been accepted, block 912 may be next.

At 912, the core network device determines whether the session transfer was rejected. In some examples, a session-transfer response may be received that indicates the session transfer has been rejected. The session-transfer response may include, e.g., a SIP 488 Not Acceptable response, e.g., from ATCF 220. If the session transfer was rejected, the next block is block 916. If not, the next block is block 914.

At 914, the core network device determines whether the timer has expired, i.e., whether a selected time has elapsed since the session transfer was initiated (block 908). In this way, the core network device awaits a rejection of the session transfer within a selected time. If the selected time has not elapsed, the next block is block 910. If the selected time has elapsed, and the session transfer has neither been accepted nor rejected, e.g., by ATCF 220, the next block may be block 920, discussed below.

In some examples, the awaiting may include measuring a response time substantially between the initiation of the session transfer and the rejection of the session transfer using a timer. It may then be determined whether the measured response time is less than the selected time.

At 916, the core network device rejects the handover. This can be done in response to the rejection of the session transfer received within the selected time including an invalid-transfer indication, as discussed above with reference to block 912. In some examples, block 916 is followed by block 918.

At 918, the core network device or the media control server transmits a fallback-trigger message. Example fallback-trigger messages are discussed herein with reference to FIGS. 7, 8, 12, and 13. The fallback-trigger message may be received by a triggerable system, which may, in response, re-initiate the communication session.

At 920, the core network device may send an SRVCC PS to CS response, e.g., according to a configuration setting of the core network device. The response may be a positive response indicating that, e.g., MME 216 may proceed with the handover. This response configuration may be used, e.g., when a session transfer is likely to succeed. The SRVCC PS to CS positive response may then trigger a handover command to the originating UE 1002.

Alternatively, the response may be an SRVCC PS to CS rejection (a negative response) indicating that, e.g., MME 216 may not proceed with the handover. This response configuration may be used, e.g., when a session transfer is not likely to succeed. The SRVCC PS to CS rejection may trigger a rejection of the handover by MME 216.

Figure 10:
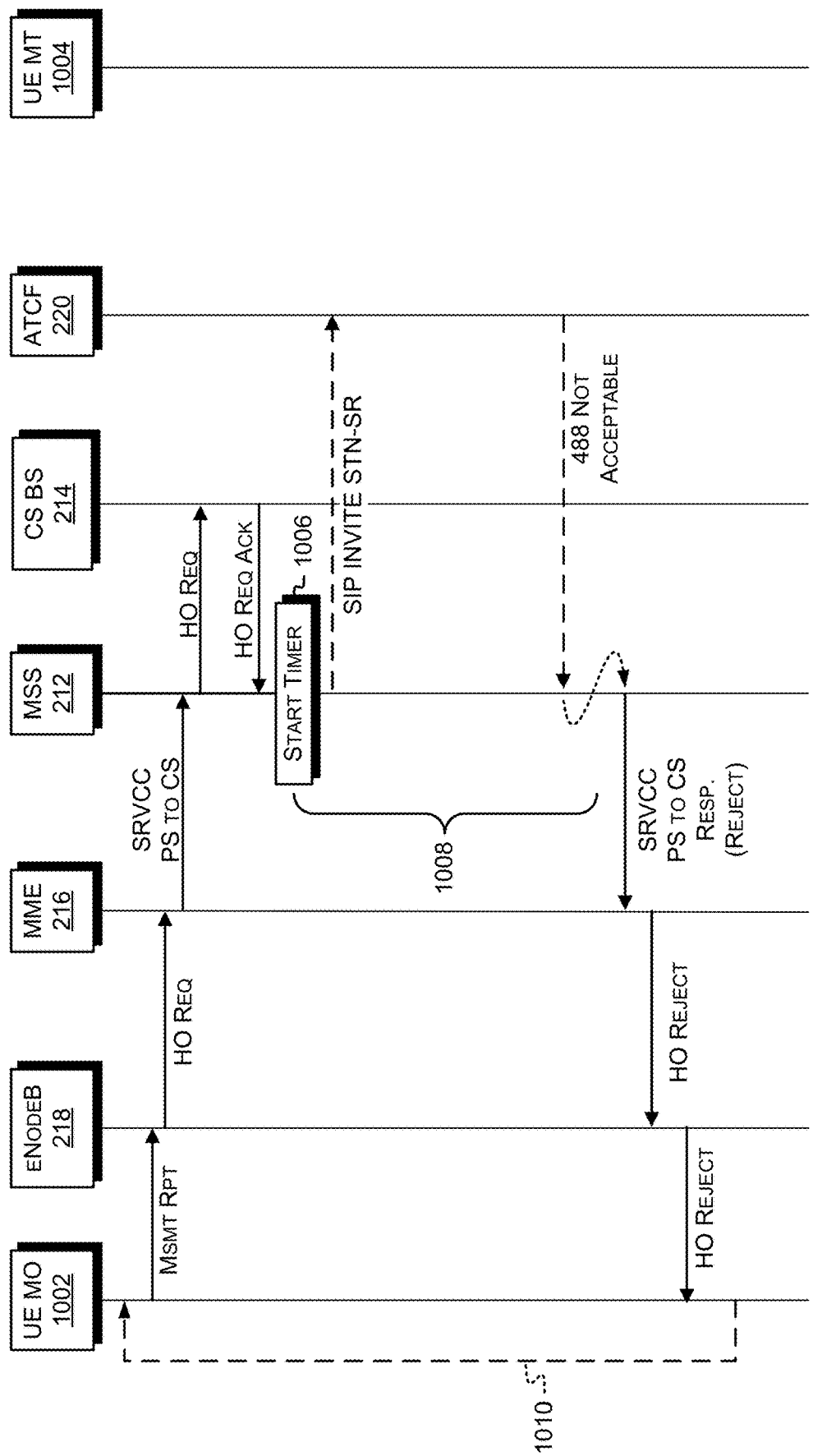
FIG. 10 is a call flow showing an example of the process shown in FIG. 9.

FIG. 10 is a call flow 1000 showing an example of the process shown in FIG. 9. Components are as shown in FIGS. 7 and 8. Originating UE 1002 has initiated the communication session to terminating UE 1004. ENodeB 218 requests a handover ("HO Req") in response to a measurement report from user equipment, in this example originating UE 1002. In this example, MSS 212 receives the handover request ("SRVCC PS to CS") from MME 216.

At 1006, MSS 212 starts the timer, as described above with reference to block 908. MSS 212 then initiates a session transfer with IMS 210 by transmitting a SIP INVITE including an STN-SR to ATCF 220. The order illustrated is not limiting; MSS 212 may transmit either of the SIP INVITE or the illustrated handover request to the CS base station 214 ("HO Req") before, after, or during block 1006. Block 1006 begins time period 1008. Time period 1008 extends until a rejection of the session transfer is received, e.g., from ATCF 220, or the selected time has passed without receiving a rejection of the session transfer.

In the example shown, a rejection of the session transfer is received within time period 1008. The illustrated session-transfer response is a SIP 488 Not Acceptable response. As indicated by the stippled arrow, in response to the rejection of the session transfer, MSS 212 rejects the handover (block 916). In the illustrated example, MSS 212 sends an SRVCC PS to CS response including a rejection to MME 216. MME 216, via eNodeB 218, passes a message rejecting the handover ("HO Reject") to originating UE 1002. In some examples, originating UE 1002 will remain connected to the first access network upon receiving the HO Reject.

In some examples, as indicated by dashed arrow 1010, originating UE 1002 can continue normal pre-establishment phase processing after receiving the HO Reject. In the illustrated example, originating UE 1002 can take subsequent measurements and handovers can be requested as desired. This may provide best-effort reconnection or handover services. As the pre-establishment phase proceeds, if signal strength or other properties of the first access network improve, it may no longer be necessary to handover. Also or alternatively, if terminating UE 1004 accepts the communication session (e.g., by transmitting a SIP 200 OK), the communication session will no longer be in the pre-establishment phase. Accordingly, ATCF 220 may be configured to correctly process handovers. In situations in which it continues to be desirable to perform a handover and terminating UE 1004 does not accept the communication session, other timeouts or fallback techniques may be used.

Figure 11:
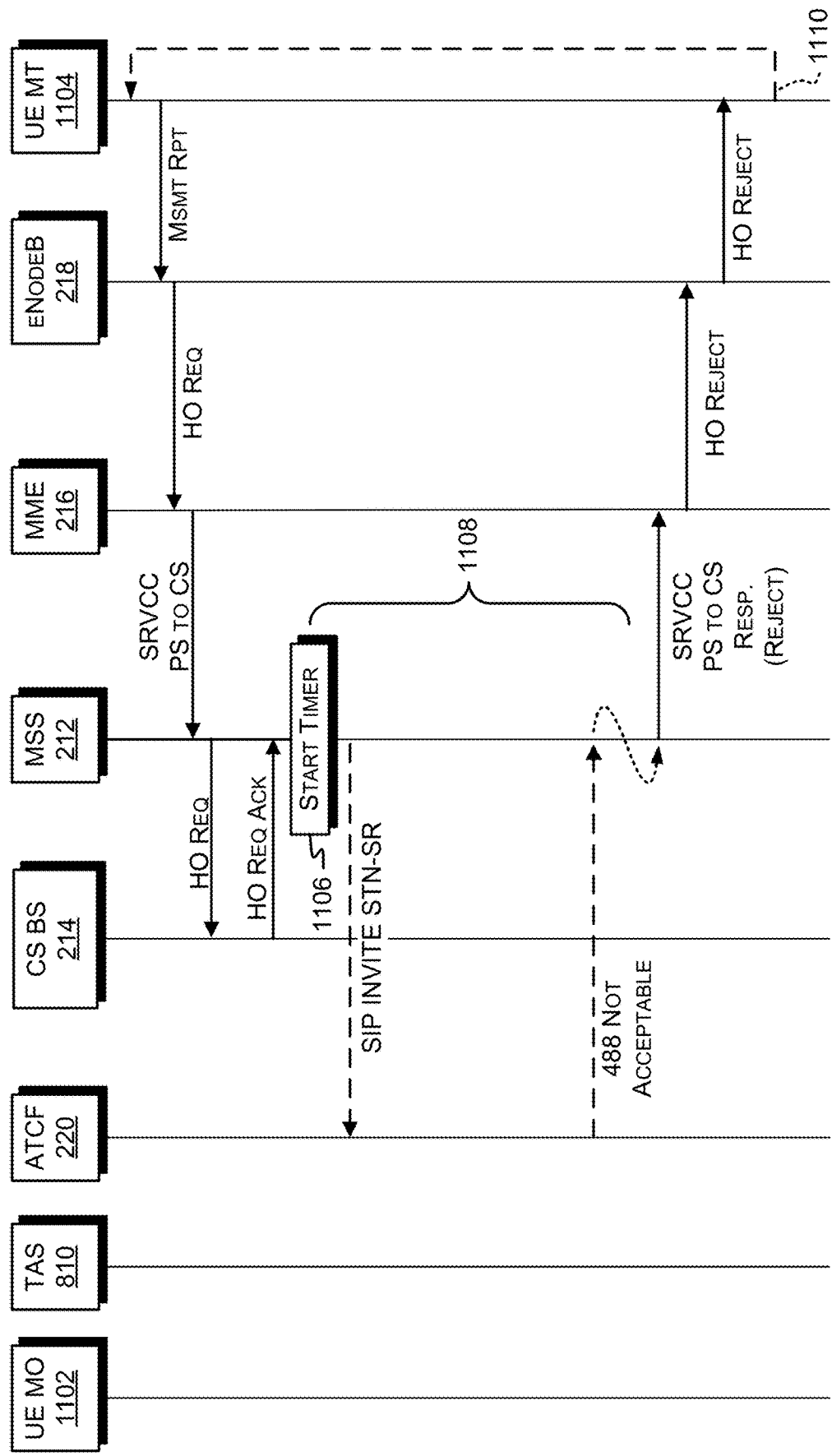
FIG. 11 is a call flow showing an example of the process shown in FIG. 9.

FIG. 11 is a call flow 1100 showing an example of the process shown in FIG. 9. Components are as shown in FIGS. 7 and 8. Originating UE 1102 has initiated the communication session to terminating UE 1104. ENodeB 218 requests a handover ("HO Req") in response to a measurement report from user equipment, in this example terminating UE 1104. In this example, MSS 212 receives the handover request ("SRVCC PS to CS") from MME 216. As discussed above with reference to block 1006, FIG. 10, MSS 212 can start a timer at 1106 and initiate a session transfer ("SIP INVITE STN-SR"). During time period 1108, MSS 212 can receive a rejection of the session transfer, e.g., a SIP 488 response, e.g., from ATCF 220. MSS 212 can then reject the handover in response to the rejection of the session transfer. As indicated by dashed arrow 1110, terminating UE 1104 can remain attached to the first access network and retry, providing a best-effort handover and continuity service.

In some examples, methods described in FIGS. 6 and 9 may be used together. As part of rejecting the handover, handover-reject and fallback-trigger messages may be transmitted in these examples.

Figure 12:
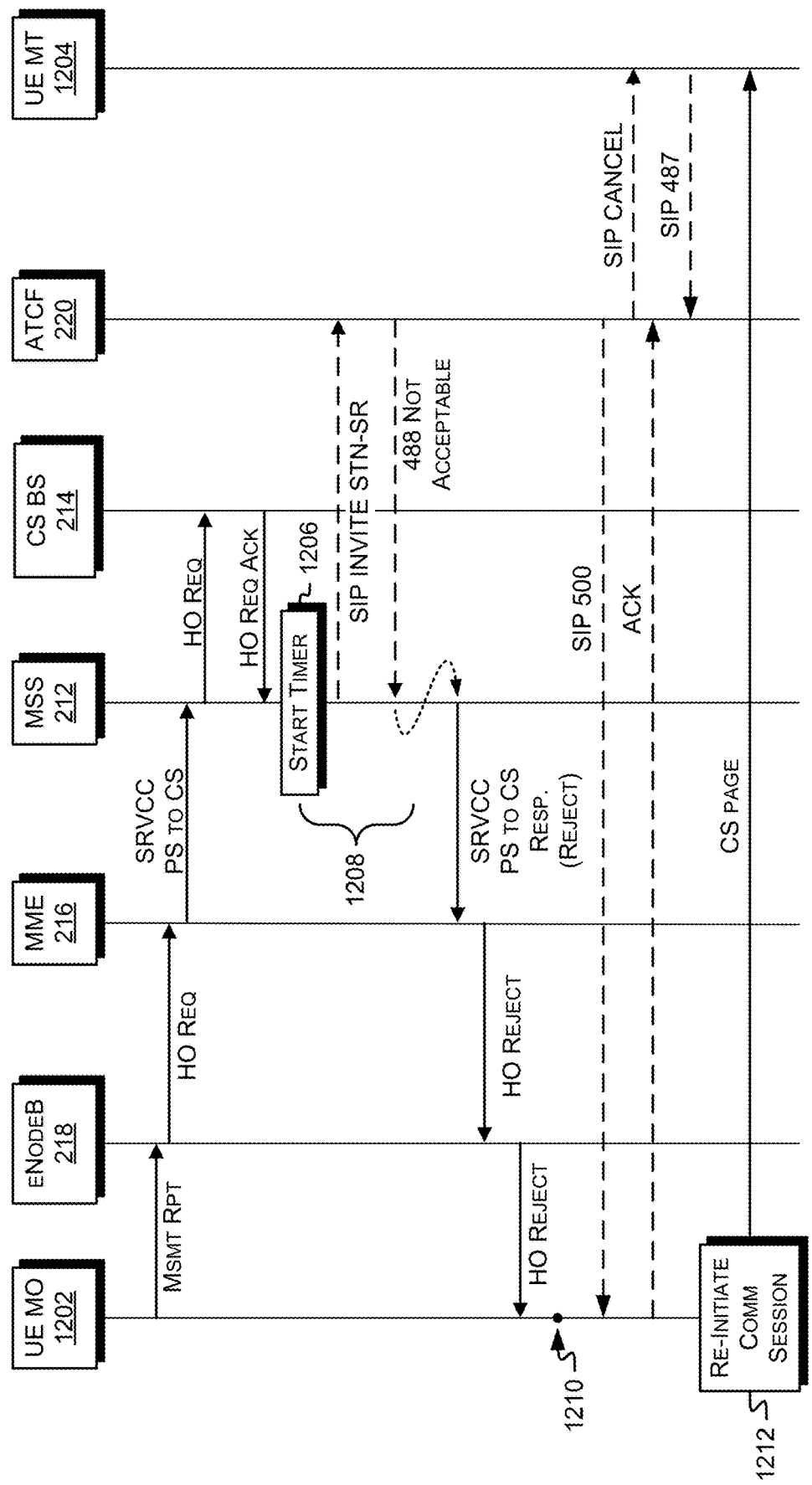
FIG. 12 is a call flow showing an example of the processes shown in FIGS. 6 and 9.

FIG. 12 is a call flow 1200 showing an example using the processes shown in FIGS. 6 and 9. Components are as shown in FIGS. 7 and 8. Originating UE 1202 has initiated the communication session to terminating UE 1204. ENodeB 218 requests a handover ("HO Req") in response to a measurement report from user equipment, in this example originating UE 1202. In this example, MSS 212 receives the handover request ("SRVCC PS to CS") from MME 216.

As described above with reference to FIG. 10, MSS 212 receives the handover request, initiates a session transfer, and starts a timer (at 1206). Within time period 1208, MSS 212 receives a rejection of the session transfer, e.g., the illustrated SIP 488 Not Acceptable response, from ATCF 220. This causes MSS 212 to reject the handover, so originating UE 1202 is still attached to the first access network at the time marked 1210.

Before, after, or concurrently with rejecting the session transfer (e.g., sending the SIP 488 response), ATCF 220 also sends a fallback-trigger message in response to the determining that the session transfer is invalid during the pre-establishment phase. In the example shown, the fallback-trigger message is a SIP 500 Internal Server Error response from ATCF 220 sent to originating UE 1202. Originating UE 1202 responds with an ACK, as shown. In response to receipt of the SIP 500 response, originating UE 1202 may re-initiate the communication session (at 1212), e.g., by sending a CS page to terminating UE 1304.

In the illustrated example, ATCF 220 also sends a cancellation message, e.g., a SIP CANCEL, to terminating UE 1204 indicating that the communication session is being cancelled. Terminating UE 1204 may respond with a SIP 487 Request Terminated response confirming that the communication session has been cancelled. This may prepare terminating UE 1204 to receive signals corresponding to re-initiation of the communication session, e.g., a CS page. The illustrated relative order of the SIP 500 response, SIP CANCEL, ACK, and SIP 487 is exemplary and not limiting. In some examples, the SIP CANCEL is transmitted before the SIP 500 response.

Figure 13:
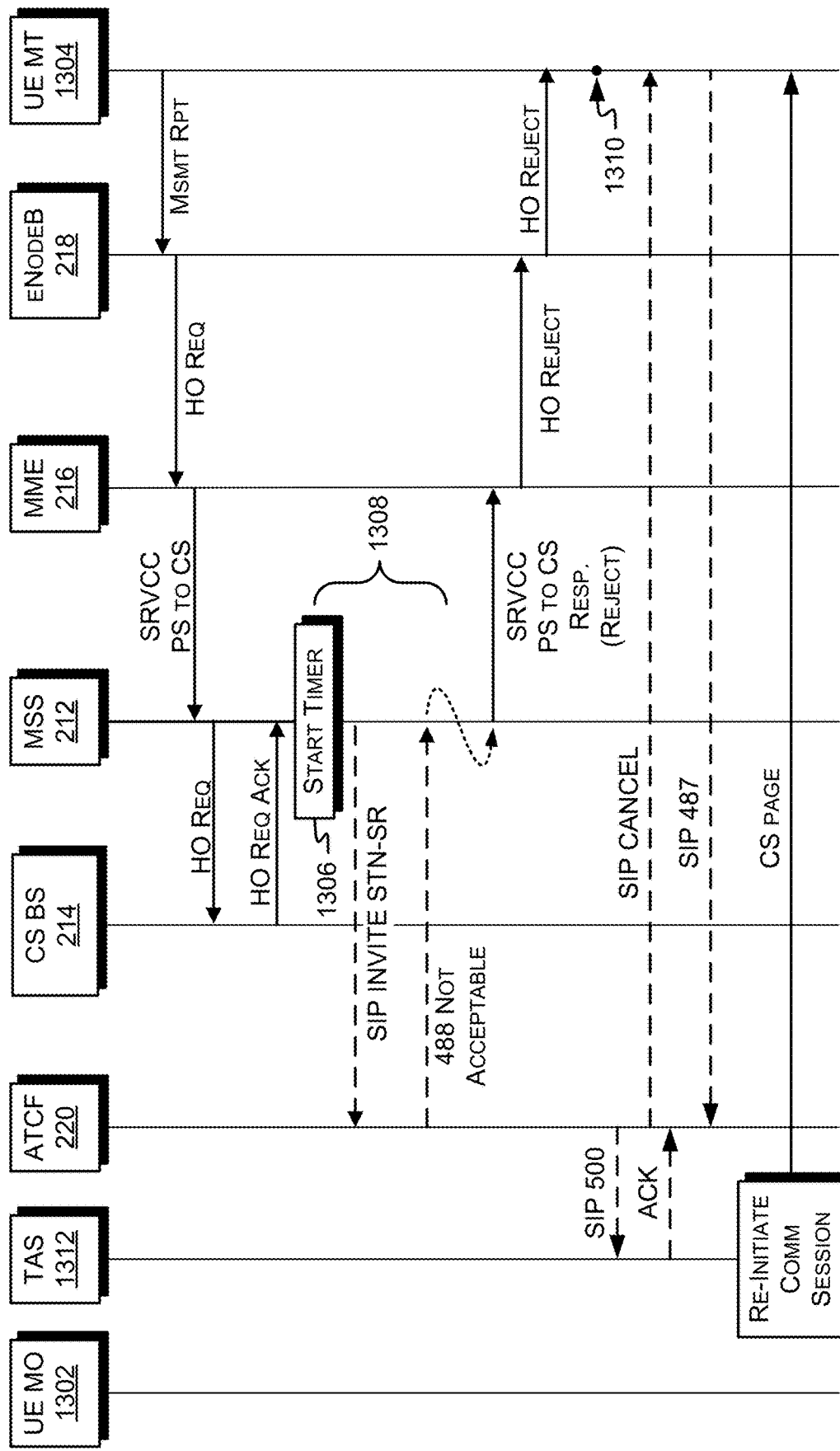
FIG. 13 is a call flow showing an example of the processes shown in FIGS. 6 and 9.

FIG. 13 is a call flow 1300 showing an example using the processes shown in FIGS. 6 and 9. Components are as shown in FIGS. 7 and 8. Originating UE 1302 has initiated the communication session to terminating UE 1304. ENodeB 218 requests a handover ("HO Req") in response to a measurement report from user equipment, in this example terminating UE 1304. In this example, MSS 212 receives the handover request ("SRVCC PS to CS") from MME 216.

As described above with reference to FIG. 11, MSS 212 receives the handover request, requests a session transfer ("SIP INVITE STN-SR"), and starts a timer (at 1306). Within time period 1308, MSS 212 receives a rejection of the session transfer, in the illustrated example a SIP 488 Not Acceptable response, from ATCF 220. This causes MSS 212 to reject the handover, so terminating UE 1304 is still attached to the first access network at the time marked 1310.

Before, after, or concurrently with rejecting the session transfer (e.g., sending the SIP 488 response), ATCF 220 also sends a fallback-trigger message in response to the determining that the session transfer is invalid during the pre-establishment phase. In the example shown, the fallback-trigger message is a SIP 500 Internal Server Error response from ATCF 220 sent to TAS 1312. TAS 1312 responds with an ACK, as shown. In response to receipt of the SIP 500 response, TAS 1312 may re-initiate the communication session (at 1314), e.g., by sending a CS page to terminating UE 1304.

In the illustrated example, ATCF 220 also sends a cancellation message, e.g., a SIP CANCEL, to terminating UE 1204 indicating that the communication session is being cancelled. Terminating UE 1204 may respond with a SIP 487 Request Terminated response confirming that the communication session has been cancelled. This may prepare terminating UE 1204 to receive signals corresponding to re-initiation of the communication session, e.g., the CS page. The illustrated relative order of the SIP 500 response, SIP CANCEL, ACK, and SIP 487 is exemplary and not limiting. In some examples, the SIP CANCEL is transmitted before the SIP 500 response.

Example Clauses

A: A telecommunication network, comprising: a mobility management entity (MME) communicatively connected with a first access network of a first type, the MME configured to receive a first handover request for handover of a communication session of user equipment during a pre-establishment phase of the communication session and to provide a second handover request; a mobile switching center server (MSS) communicatively connected with a second access network of a second, different type, the MSS configured to receive the second handover request, to allocate second access network resources for the communication session, and to initiate a session transfer; and a media-control server responsive to the initiated session transfer to determine that the session transfer is invalid during the pre-establishment phase and to reject the session transfer; wherein the MSS is further responsive to the rejection of the session transfer within a selected time following the initiation of the session transfer to reject the second handover request; and the MME is responsive to the rejection of the second handover request handover rejection to reject the first handover request.

B: The telecommunication network of paragraph A, wherein the media-control server is an Access Transfer Control Function server (ATCF) configured to reject the session transfer by providing a Session Initiation Protocol (SIP) four eighty-eight response to the MSS.

C: The telecommunication network of paragraph A or B, wherein the MSS further includes a timer configured to measure a response time substantially between the initiation of the session transfer and the rejection of the session transfer, and the MSS is configured to determine whether the response time is less than the selected time.

D: The telecommunication network of any of paragraphs A-C, wherein the media control server is further configured to transmit a fallback-trigger message to the user equipment in response to the determining that the session transfer is invalid, wherein the user equipment is originating user equipment of the communication session.

E: The telecommunication network of any of paragraphs A-D, further including an application server (AS), wherein the media control server is further configured to transmit a fallback-trigger message to the AS in response to the determining that the session transfer is invalid, wherein the user equipment is terminating user equipment of the communication session.

F: The telecommunication network of any of paragraphs A-E, wherein the first type is a packet-switched type and the second type is a circuit-switched type.

G: A method comprising: receiving, by a core network device of a telecommunication network, during a pre-establishment phase of a communication session, a handover request for the communication session of user equipment from a first access network of a first type to a second access network of a second, different type; in response to the received handover request, initiating, by the core network device, a session transfer; awaiting, by the core network device, a rejection of the session transfer within a selected time; and rejecting the handover, by the core network device, in response to the rejection of the session transfer received within the selected time.

H: The method of paragraph G, wherein the core network device is a mobile switching center server (MSS).

I: The method of paragraph G or H, wherein the rejection of the session transfer includes a Session Initiation Protocol (SIP) four eighty-eight response.

J: The method of any of paragraphs G-I, wherein the awaiting includes measuring a response time substantially between the initiation of the session transfer and the rejection of the session transfer using a timer and determining whether the measured response time is less than the selected time.

K: The method of any of paragraphs G-J, wherein the first type is a packet-switched type and the second type is a circuit-switched type.

L: A method comprising: receiving, by a core network device of a telecommunication network, during a pre-establishment phase of a communication session, an initiation of a session transfer of user equipment for the communication session from a first access network of a first type to a second access network of a second, different type; determining, by the core network device, that the initiated session transfer is invalid; transmitting, by the core network device, a rejection of the session transfer to a handover-control device of the telecommunication network; and transmitting, by the core network device, a fallback-trigger message to a triggerable system.

M: The method of paragraph L, wherein the handover-control device is a mobile switching center server (MSS), the triggerable system is the user equipment, and the user equipment is originating user equipment of the communication session.

N: The method of paragraph L or M, wherein the handover-control device is a mobile switching center server (MSS), the triggerable system is a telephony application server (TAS), and the user equipment is terminating user equipment of the communication session.

O: The method of any of paragraphs L-N, wherein the rejection of the session transfer includes a Session Initiation Protocol (SIP) four eighty-eight response and the fallback-trigger message includes a SIP five hundred response.

P: The method of any of paragraphs L-O, wherein the first type is a packet-switched type and the second type is a circuit-switched type.

Q: The method of any of paragraphs L-P, wherein the core network device is an Access Transfer Control Function server (ATCF).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
receiving, by a first network device of a telecommunication network, during a Session Initiation Protocol (SIP) early dialog state of a communication session, an initiation of a session transfer of a first user equipment for the communication session from a first access network of a first type to a second access network of a second, different type, wherein the first network device is different from the first user equipment;
determining, by the first network device, during the early dialog state, that the initiated session transfer is invalid; and
at least partly in response to determining that the initiated session transfer is invalid:
 transmitting, by the first network device, during the early dialog state, a rejection of the session transfer to a handover-control device of the telecommunication network;
 transmitting, by the first network device, during the early dialog state, a fallback-trigger message to a triggerable system; and
 transmitting, by the first network device, during the early dialog state, a cancellation message to a terminating user equipment of the communication session, wherein the terminating user equipment is different from the triggerable system.

2. The method of claim 1, wherein:
the handover-control device is a mobile switching center server (MSS);
the triggerable system is the first user equipment;
the first user equipment is an originating user equipment of the communication session; and
the first user equipment is different from the terminating user equipment.

3. The method of claim 1, wherein:
the handover-control device is a mobile switching center server (MSS);
the triggerable system is a telephony application server (TAS); and
the first user equipment is the terminating user equipment of the communication session.

4. The method of claim 1, wherein the rejection of the session transfer includes a SIP four eighty-eight response and the fallback-trigger message includes a SIP five hundred response.

5. The method of claim 1, wherein the first type is a packet-switched type and the second type is a circuit-switched type.

6. The method of claim 1, wherein the first network device is an Access Transfer Control Function server (ATCF).

7. At least one tangible, non-transitory computer-readable medium (CRM) comprising instructions that, when executed by one or more processors, cause the one or more processors to perform operations comprising:
receiving, during a Session Initiation Protocol (SIP) early dialog state of a communication session, an initiation of a session transfer of a first user equipment for the communication session from a first access network to a second access network;
determining, during the early dialog state, that the initiated session transfer is invalid; and
at least partly in response to determining that the initiated session transfer is invalid:
 transmitting, during the early dialog state, a rejection of the session transfer to a handover-control device of a telecommunication network;
 transmitting, during the early dialog state, a fallback-trigger message to a triggerable system; and
 transmitting, during the early dialog state, a cancellation message to a terminating user equipment of the communication session, wherein the terminating user equipment is different from the triggerable system.

8. The at least one tangible, non-transitory CRM of claim 7, wherein the first user equipment is different from terminating user equipment.

9. The at least one tangible, non-transitory CRM of claim 7, wherein:
the handover-control device is a mobile switching center server (MSS);
the triggerable system is the first user equipment;
the first user equipment is an originating user equipment of the communication session; and
the first user equipment is different from the terminating user equipment.

10. The at least one tangible, non-transitory CRM of claim 7, wherein:
the handover-control device is a mobile switching center server (MSS);
the triggerable system is a telephony application server (TAS); and
the first user equipment is the terminating user equipment of the communication session.

11. The at least one tangible, non-transitory CRM of claim 7, wherein the rejection of the session transfer includes a SIP four eighty-eight response and the fallback-trigger message includes a SIP five hundred response.

12. The at least one tangible, non-transitory CRM of claim 7, wherein the first access network is of a first type and the second access network is of a second, different type.

13. A telecommunication system, comprising:
a mobility management entity (MME) communicatively connected with a first access network, the MME configured to:
 receive a first handover request for handover of a first communication session of a first user equipment during a Session Initiation Protocol (SIP) early dialog state of the first communication session;

provide a second handover request in response to the first handover request;
receive a third handover request for handover of a second communication session of a second user equipment during a SIP early dialog state of the second communication session; and
provide a fourth handover request different from the second handover request in response to the third handover request;
a mobile switching center server (MSS) communicatively connected with a second access network, the MSS configured to:
receive the second handover request;
allocate first resources in the second access network for the first communication session in response to the second handover request;
initiate a first session transfer, the first session transfer associated with the first communication session;
receive the fourth handover request;
allocate second resources in the second access network for the second communication session in response to the fourth handover request; and
initiate a second session transfer, the second session transfer associated with the second communication session; and
an Access Transfer Control Function server (ATCF) configured to, in response to the first session transfer:
determine that the first session transfer is invalid by determining:
that the first session transfer is a session transfer during the SIP early dialog state; and
that a session transfer during the SIP early dialog state of the first communication session is not supported; and
in response to the determination that the first session transfer is invalid, reject the first session transfer by:
transmitting during the early dialog state of the first communication session, a rejection of the first session transfer to the MSS;
transmitting during the early dialog state of the first communication session, a fallback-trigger message to a triggerable system; and
transmitting during the early dialog state of the first communication session, a cancellation message to a terminating user equipment of the first communication session, wherein the terminating user equipment is different from the triggerable system;
wherein the MSS is further configured to:
in response to the rejection of the first session transfer within a selected time following the initiation of the first session transfer, reject the second handover request; and
in response to expiration of a selected time following the initiation of the second session transfer, transmit a positive response to the fourth handover request; and
wherein the MME is further configured to:
reject the first handover request responsive to the rejection of the second handover request; and
cause a handover of the second communication session responsive to receiving the positive response to the fourth handover request.

14. The telecommunication system of claim 13, wherein:
the triggerable system is the first user equipment;
the first user equipment is an originating user equipment of the first communication session; and
the first user equipment is different from the terminating user equipment of the first communication session.

15. The telecommunication system of claim 13, wherein:
the triggerable system is a telephony application server (TAS); and
the first user equipment is the terminating user equipment of the first communication session.

16. The telecommunication system of claim 13, wherein the rejection of the session transfer includes a SIP four eighty-eight response and the fallback-trigger message includes a SIP five hundred response.

17. The telecommunication system of claim 13, wherein the first access network is of a first type and the second access network is of a second, different type.

* * * * *